US012497262B2

(12) United States Patent
Wada et al.

(10) Patent No.: US 12,497,262 B2
(45) Date of Patent: Dec. 16, 2025

(54) PAPER SHEET HANDLING APPARATUS

(71) Applicant: FUJITSU FRONTECH LIMITED, Inagi (JP)

(72) Inventors: Takashi Wada, Inagi (JP); Yuji Tanaka, Inagi (JP); Satoshi Hayashi, Inagi (JP); Hiroshi Miyazaki, Inagi (JP); Mitsutaka Nishida, Inagi (JP); Atsushi Ando, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 36 days.

(21) Appl. No.: 18/675,935

(22) Filed: May 28, 2024

(65) Prior Publication Data

US 2024/0312281 A1 Sep. 19, 2024

Related U.S. Application Data

(63) Continuation of application No. PCT/JP2021/047616, filed on Dec. 22, 2021.

(51) Int. Cl.

*B65H 31/24* (2006.01)
*B65H 1/06* (2006.01)
*B65H 31/30* (2006.01)

(Continued)

(52) U.S. Cl.

CPC ............... *B65H 31/24* (2013.01); *B65H 1/06* (2013.01); *B65H 31/3063* (2013.01);

(Continued)

(58) Field of Classification Search

CPC ... B65H 1/06; B65H 1/08; B65H 1/10; B65H 1/12; B65H 3/063; B65H 31/08;

(Continued)

(56) References Cited

U.S. PATENT DOCUMENTS

2013/0156484 A1* 6/2013 Mandel ................ B65H 3/0833 400/621
2015/0183594 A1* 7/2015 Kodama .................. B65H 9/04 271/234
2016/0090249 A1* 3/2016 Suzuki ................ B65H 3/0883 271/9.08

FOREIGN PATENT DOCUMENTS

CN 207601909 U 7/2018
JP 07220139 A 8/1995

(Continued)

OTHER PUBLICATIONS

ISR issued in PCT/JP2021/047616, mailed Mar. 8, 2022.

(Continued)

*Primary Examiner* — Prasad V Gokhale
(74) *Attorney, Agent, or Firm* — Greer Burns & Crain Ltd.

(57) ABSTRACT

A paper sheet handling apparatus includes: a first stopper that is in contact with a first partition at a lower limit position of the first partition; and a pressing portion that is fixed to a second partition and raises and lowers the first partition integrally with the second partition using a frictional force generated by pressing a guide. The second partition descends integrally with the first partition, and after the first partition comes into contact with the first stopper, the second partition descends independently of the first partition against the frictional force to a position where the pressing portion faces the recessed portion that cancels the frictional force. The second partition, when ascending from the position where the pressing portion faces the recessed portion to a position where the pressing portion no longer faces the recessed portion, ascends integrally with the first partition due to the frictional force.

3 Claims, 29 Drawing Sheets

(51) Int. Cl.
*B65H 83/02* (2006.01)
*G07D 11/13* (2019.01)

(52) U.S. Cl.
CPC ............. *B65H 83/02* (2013.01); *G07D 11/13* (2019.01); *B65H 2301/4223* (2013.01); *B65H 2405/332* (2013.01); *B65H 2405/353* (2013.01); *B65H 2701/1912* (2013.01); *G07D 2211/00* (2013.01)

(58) Field of Classification Search
CPC .... B65H 31/24; B65H 31/3063; B65H 83/02; B65H 2301/4223; B65H 2405/332; B65H 2405/353; B65H 2701/1912; G07D 11/12; G07D 11/13; G07D 2211/00
See application file for complete search history.

(56) References Cited

FOREIGN PATENT DOCUMENTS

| | | | |
|---|---|---|---|
| JP | 2005352912 | A | 12/2005 |
| JP | 2006092145 | A | 4/2006 |
| JP | 2018032341 | A | 3/2018 |
| JP | 2018116339 | A | 7/2018 |

OTHER PUBLICATIONS

Written opinion issued in PCT/JP2021/047616, mailed Mar. 8, 2022.
Search Report issued in corresponding European patent application No. EP21 968 932.0, dated Jan. 21, 2025.

* cited by examiner

PAPER SHEET HANDLING APPARATUS

CROSS-REFERENCE TO RELATED APPLICATION

This application is continuation application of International Application PCT/JP2021/047616 filed on Dec. 22, 2021 and designated the U.S., the entire contents of which are incorporated herein by reference.

BACKGROUND

Technical Field

Embodiments discussed herein are relate to a paper sheet handling apparatus.

Related Art

Conventionally, a member such as a plate and belt that partitions a storage space for a bank bill into upper and lower portions is arranged in a recharging machine, an automated teller machine (ATM), or the like. For example, an apparatus including a pair of upper and lower conveying belts that sandwiches and conveys a bank bill is known (See, for example, JP H7-220139 A).

In addition, an apparatus including an upper surface guide and a stage driven by a driving force of a common drive motor is also known (See, for example, JP 2018-032341 A).

SUMMARY

A paper sheet handling apparatus according to the present disclosure includes: a plurality of partitions having a first partition and a second partition arranged below the first partition, the plurality of partitions being capable of ascending and descending to form a storage space for a paper sheet; a guide fixed to the first partition and extending downward; a first stopper that is in contact with the first partition at a lower limit position of the first partition; and a pressing portion that is fixed to the second partition and raises and lowers the first partition integrally with the second partition using a frictional force generated by pressing the guide, in which the guide has a recessed portion that cancels the frictional force, the second partition descends integrally with the first partition, and after the first partition comes into contact with the first stopper, the second partition descends independently of the first partition against the frictional force to a position where the pressing portion faces the recessed portion, and the second partition, when ascending from a position where the pressing portion faces the recessed portion to a position where the pressing portion no longer faces the recessed portion, ascends integrally with the first partition due to the frictional force.

The object and advantages of the present invention will be realized by the elements set forth in the claims or combinations thereof.

DETAILED DESCRIPTION

Meanwhile, a plurality of partition members that can ascend and descend may be arranged to partition a storage space for a paper sheet such as a bank bill into upper and lower portions. The plurality of partition members are, for example, a partition member on which the paper sheet is placed, a partition member that presses the paper sheet placed on another partition member positioned below downward, a partition member arranged above the paper sheet to form a storage space at a predetermined height, and the like.

To independently raise and lower each of the plurality of partition members to a plurality of predetermined positions (heights), a plurality of drive sources that drive the partition members are arranged. However, arranging the plurality of drive sources results in a larger apparatus and also makes it difficult to reduce the costs.

Hereinafter, a paper sheet handling apparatus according to an embodiment of the present invention will be described with reference to the drawings using a bank bill processing machine 100 as an example.

Figure 1:
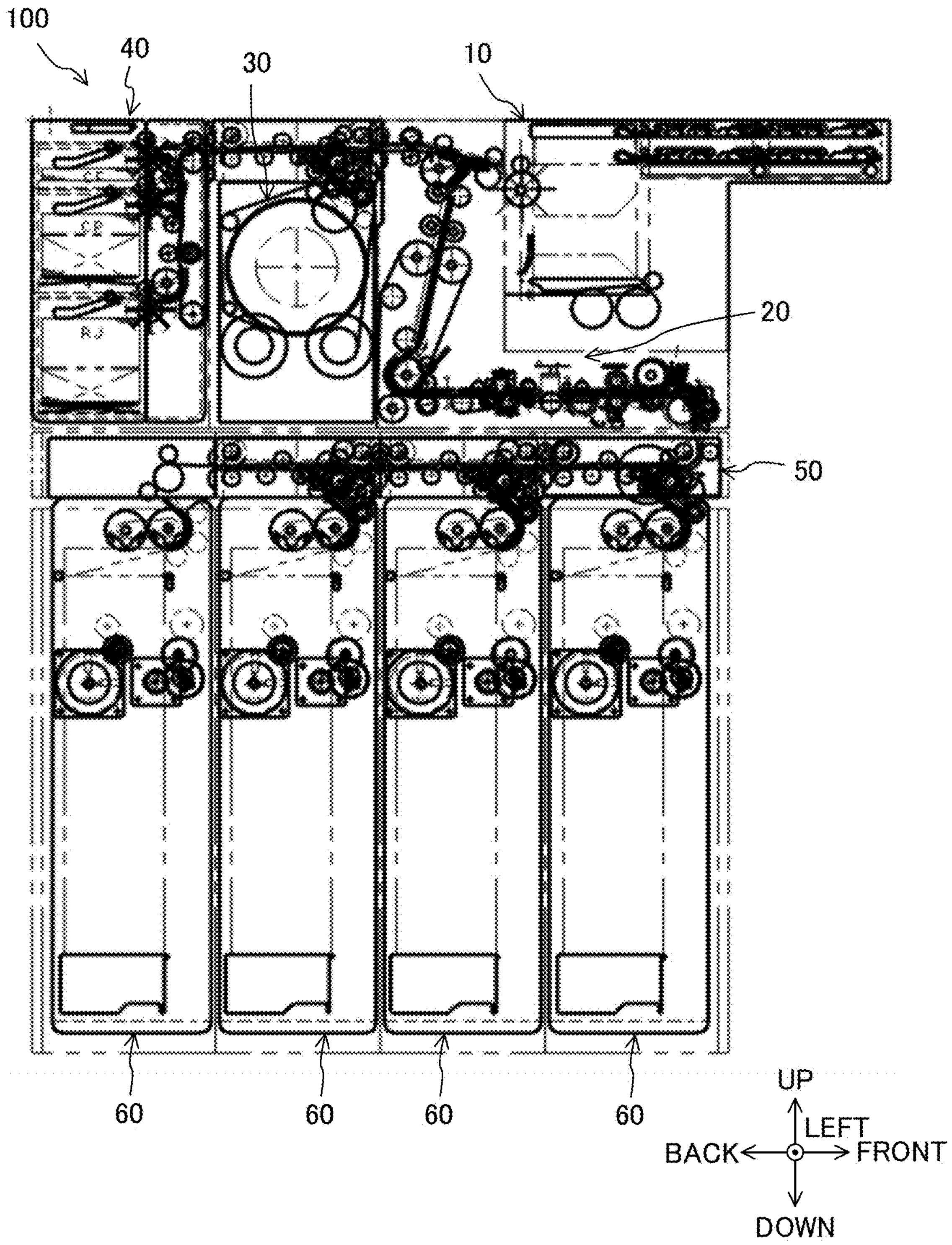
FIG. 1 is a left side view illustrating an internal structure of a bank bill processing machine in one embodiment.

FIG. 1 is a left side view illustrating an internal structure of the bank bill processing machine 100.

Note that the up-down, front-back, and left-right directions illustrated in FIG. 1 and FIGS. 2A to 13 to be described later are merely an example of a case where a customer side of the bank bill processing machine 100 is the front direction, but for example, the up-down direction is a vertical direction, and the front-back direction and the left-right direction are horizontal directions.

The bank bill processing machine 100 illustrated in FIG. 1 is, for example, an ATM, a bill recycle unit (BRU), a cash dispenser (CD), a teller cash recycler (TCR), or the like, and includes a bank bill deposit/withdrawal unit 10, a discrimination unit 20, a primary holding unit 30, a rejection unit 40, an intermediate conveying unit 50, and a plurality of storage cassettes 60. Note that the bank bill processing machine 100 is an example of a paper sheet handling apparatus, but the paper sheet handling apparatus may be any apparatus as long as it conveys or performs some processing on a paper sheet including a bank bill B as an example, and thus the paper sheet handling apparatus can be regarded as, for example, only the bank bill deposit/withdrawal unit 10.

Although the bank bill deposit/withdrawal unit 10 will be described in detail later, the bank bill deposit/withdrawal unit 10 is provided at the upper portion of the front end of a guide mechanism, and is where the bank bill B to be deposited is inserted and the bank bill B to be withdrawn is ejected.

The discrimination unit 20 is arranged below the bank bill deposit/withdrawal unit 10 and determines authenticity, contamination, a folded corner, and the like of the bank bill B conveyed from the bank bill deposit/withdrawal unit 10.

The primary holding unit 30 temporarily stores the bank bill B and the like that are conveyed from the bank bill deposit/withdrawal unit 10 to the discrimination unit 20 and determined to be normal at the discrimination unit 20.

The rejection unit 40 stores an unreturned bank bill B among the bank bills B determined to be abnormal at the discrimination unit 20.

The intermediate conveying unit 50 conveys the bank bill B in the front-back direction between the discrimination unit 20 and the plurality of storage cassettes 60.

The plurality of storage cassettes 60 store, for example, the bank bills B of different denominations. The storage cassettes 60 can eject the stored bank bills B. The bank bills B stored in the storage cassettes 60 are thus used for withdrawal.

Figure 2A:
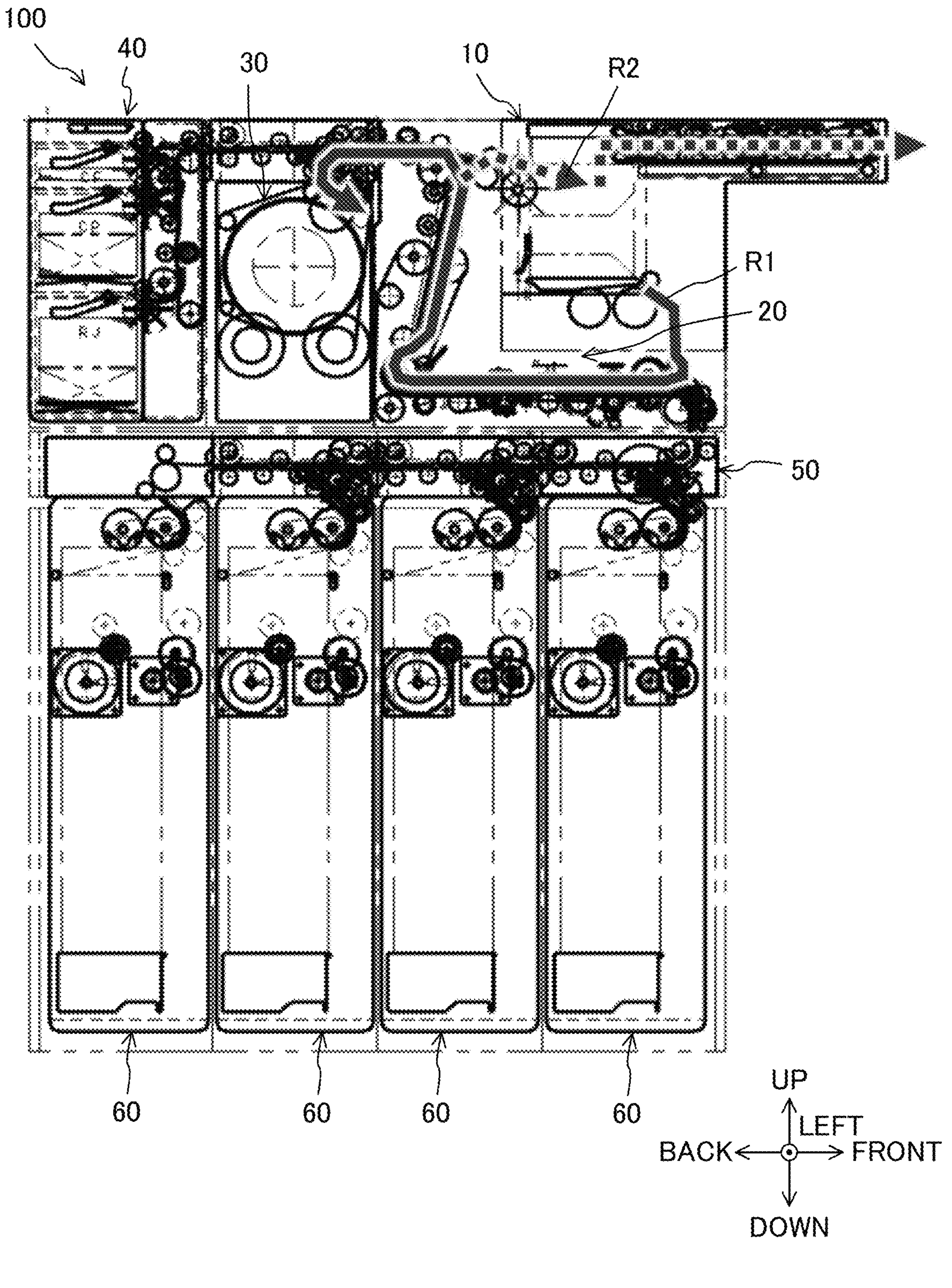
FIG. 2A is a left side view illustrating an internal structure of a bank bill processing machine for explaining first deposit processing in one embodiment.
Figure 2B:
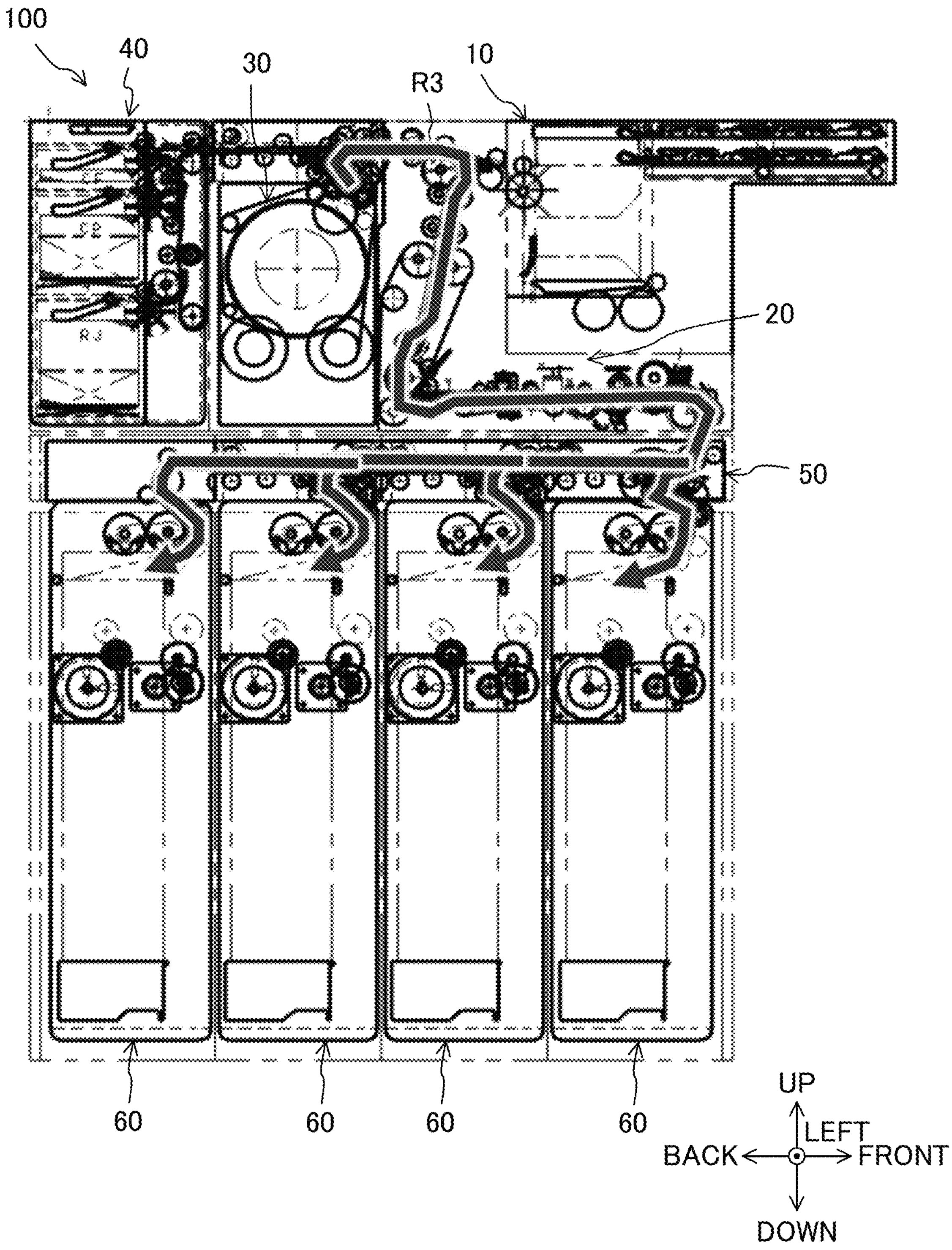
FIG. 2B is a left side view illustrating the internal structure of the bank bill processing machine for explaining second deposit processing in the one embodiment.
Figure 2C:
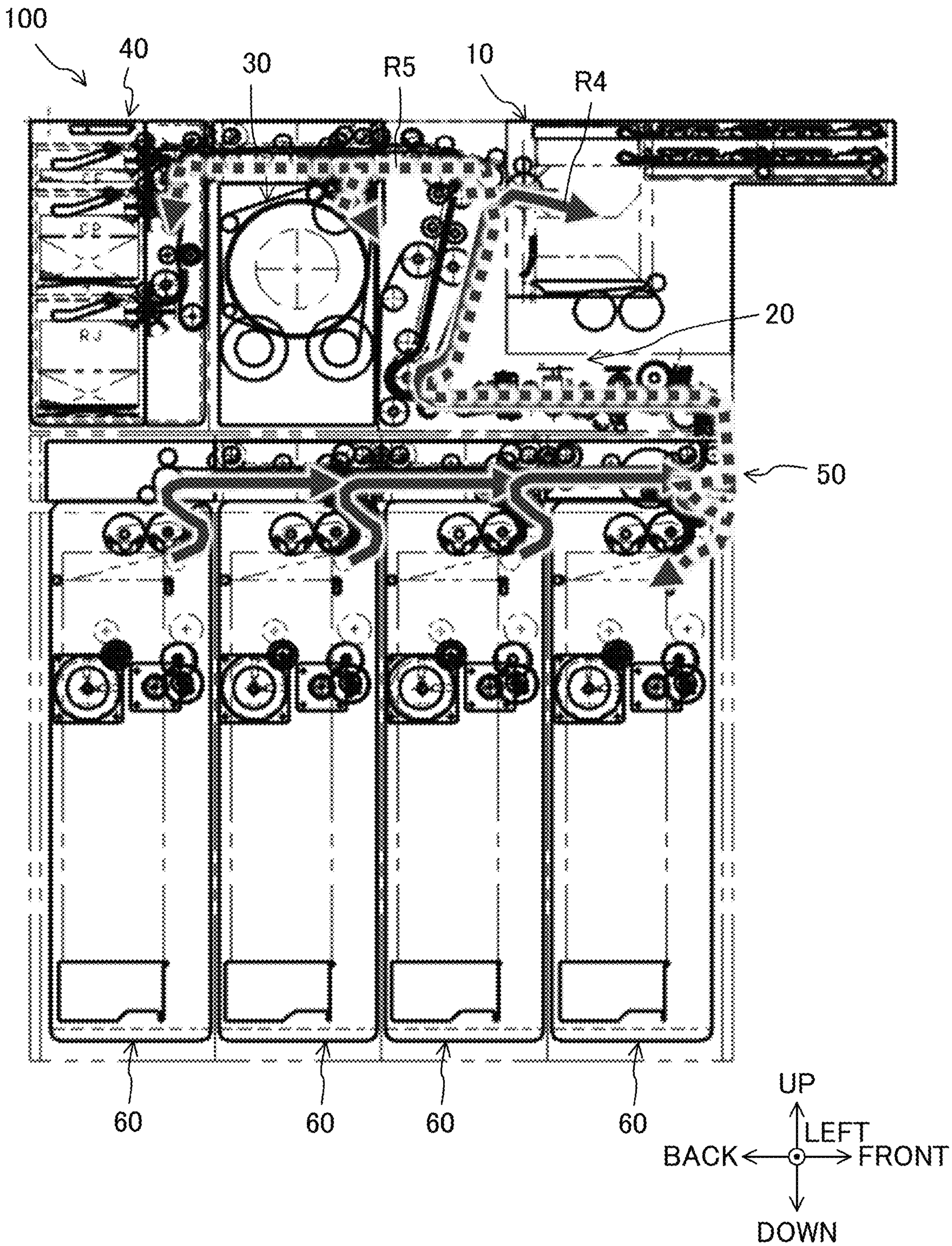
FIG. 2C is a left side view illustrating the internal structure of the bank bill processing machine for explaining withdrawal processing in the one embodiment.

FIG. 2A to 2C are left side views illustrating an internal structure of the bank bill processing machine 100 for explaining first deposit processing, second deposit processing, and withdrawal processing.

First, as illustrated in a conveyance route R1 indicated by the thick solid arrow in FIG. 2A, the bank bill B inserted into the bank bill deposit/withdrawal unit 10 is conveyed to the discrimination unit 20. Then, the bank bill B determined to be normal at the discrimination unit 20 is conveyed to the primary holding unit 30.

On the other hand, as illustrated in a conveyance route R2 indicated by the thick dotted arrow in FIG. 2A, the bank bill B determined to be abnormal at the discrimination unit 20 (such as a bogus bank bill) is returned to the bank bill deposit/withdrawal unit 10.

As illustrated in a conveyance route R3 indicated by the thick solid arrow in FIG. 2B, the bank bill B temporarily stored in the primary holding unit 30 is conveyed through the discrimination unit 20 and the intermediate conveying unit 50 and conveyed to each storage cassette 60.

As illustrated in a conveyance route R4 indicated by the thick solid arrow in FIG. 2C, at the time of withdrawal, the bank bill B stored in each storage cassette 60 is ejected to the bank bill deposit/withdrawal unit 10 by the intermediate conveying unit 50 and the discrimination unit 20. In addition, as illustrated in a conveyance route R5 indicated by the thick dotted arrow in FIG. 2C, the bank bill B determined to be abnormal by the discrimination unit 20 among the bank bills B stored in each storage cassette 60 is conveyed to the primary holding unit 30 or the rejection unit 40.

Figure 3:
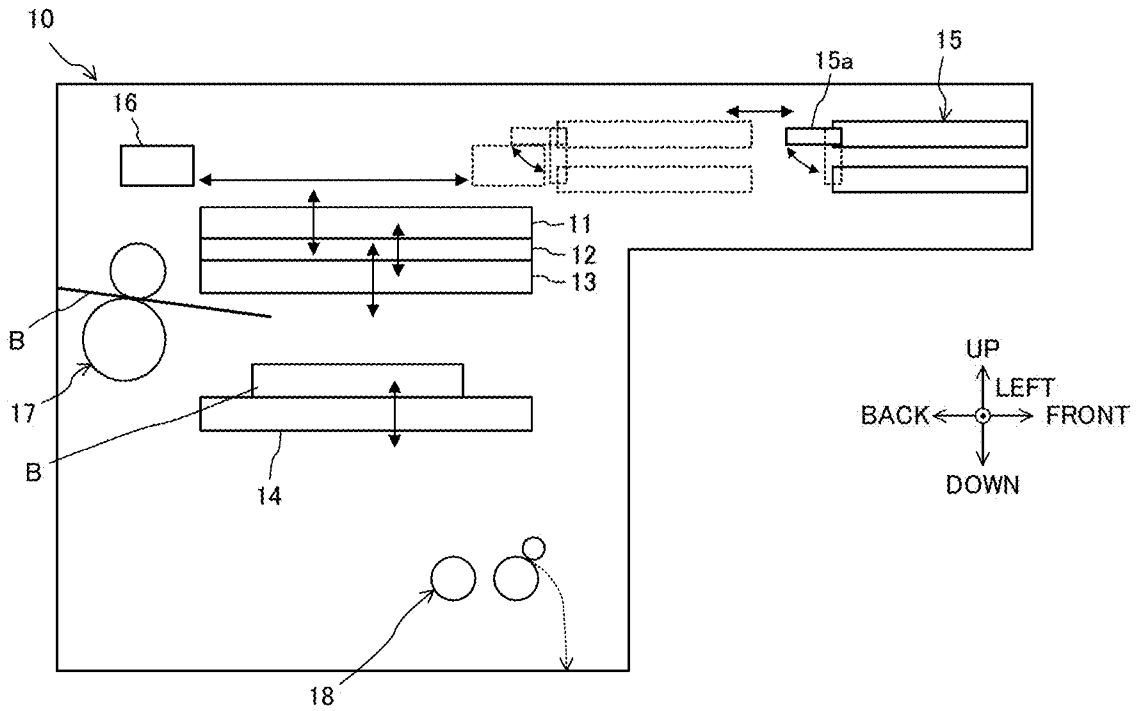
FIG. 3 is a left side view illustrating an internal structure of a bank bill deposit/withdrawal unit in one embodiment.

FIG. 3 is a left side view illustrating the internal structure of the bank bill deposit/withdrawal unit 10.

As illustrated in FIG. 3, the bank bill deposit/withdrawal unit 10 includes a roof 11 (an example of a first partition member), a pusher plate 12 (an example of a second partition member), a pusher 13 (an example of a third partition member), a stage 14, a shuttle 15, a push-in wall 16, a receiving unit 17, and a sending unit 18. As will be described later, as illustrated in FIGS. 6 to 13, the bank bill deposit/withdrawal unit 10 further includes two guides 2, two pressing portions 3, a movable member 4, a timing belt 5, a tension spring 6, and two rails 7 (see FIG. 10). Note that, in the present embodiment, the plate-shaped roof 11 (first partition member), the pusher plate 12 (second partition member), and the pusher 13 (third partition member) will be described as an example of the plurality of partition members, but the partition member (partition) is not limited to a plate-shaped member, and may be, for example, a member having a roller, a belt, or the like and capable of conveying the bank bill B.

The roof 11 is arranged so as to be capable of ascending and descending.

The pusher plate 12 is arranged below the roof 11. The pusher plate 12 is arranged so as to be capable of ascending and descending, and receives the bank bill B to be returned from the receiving unit 17 among the bank bills B sent from the stage 14 by the sending unit 18.

Figure 11:
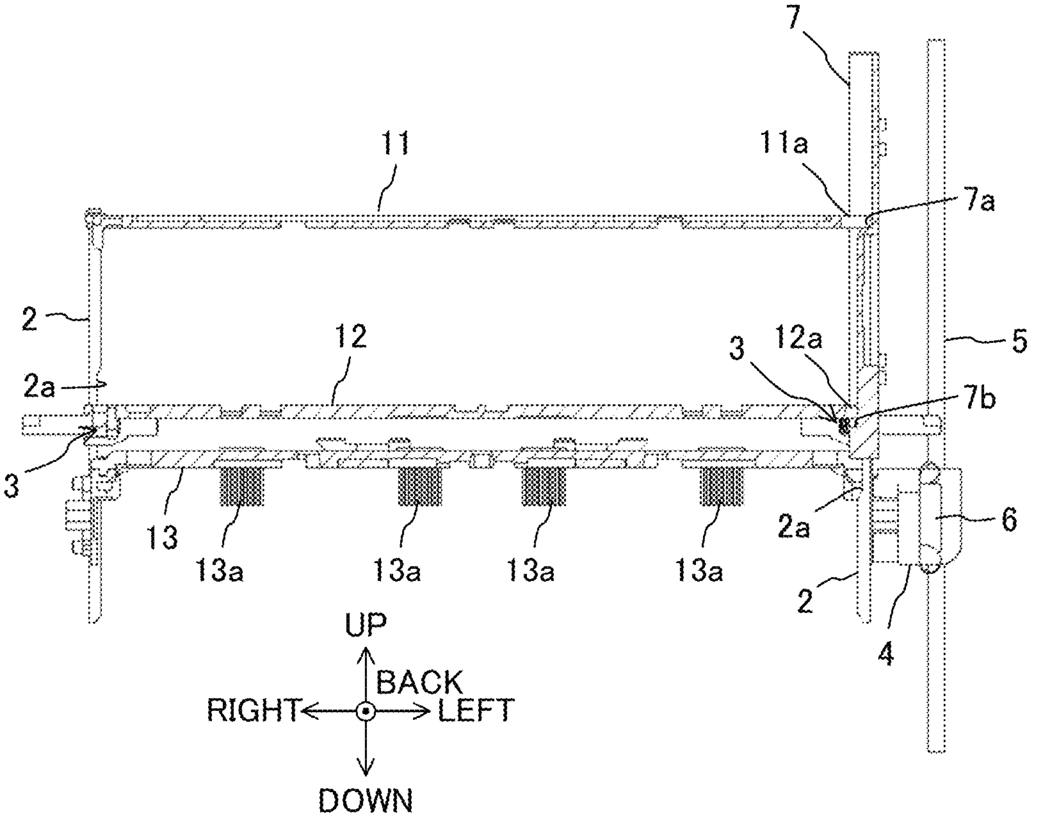
FIG. 11 is a cross-sectional view illustrating a roof, the pusher plate, the pusher, and the like in one embodiment.

The pusher 13 is arranged below the pusher plate 12. The pusher 13 is arranged so as to be capable of ascending and descending, and can press the bank bill B on the stage 14 from above. Note that, as illustrated in FIG. 11 to be described later, a plurality of entry prevention members 13*a* that prevent the bank bill B from entering from below the pusher 13 are arranged on the pusher 13 with a space therebetween in the left-right direction so as to hang downward.

The stage 14 is arranged so as to be capable of ascending and descending, and as illustrated in FIG. 3, the bank bills B to be withdrawn or the bank bills B to be deposited are stacked on the stage 14. Note that the stage 14 ascends and descends due to driving of a drive unit (for example, a motor) different from a drive unit that raises and lowers the pusher 13.

The shuttle 15 has, for example, a pair of upper and lower conveying belts capable of sandwiching the bank bill B, and moves in the front-back direction between a front position at the time of the deposit and withdrawal of the bank bill B (see the solid line in FIG. 3) and a back position at which the bank bill B is received and passed from and to the stage 14 (see the dotted line in FIG. 3). A stopper 15*a* is provided at the back end of the shuttle 15 to prevent the bank bill B from falling backward from the shuttle 15. The stopper 15*a* rotates to a position where a space between the back ends of the pair of upper and lower conveying belts of the shuttle 15 is opened (see the solid line in FIG. 3) and a position where the space is closed (see the dotted line in FIG. 3).

The push-in wall 16 is arranged to be movable in the front-back direction, and pushes the bank bill B on the stage 14 forward toward the shuttle 15 at the time of withdrawal (moves from the position of the solid line to the position of the dotted line in FIG. 3).

The receiving unit 17 has, for example, an impeller and a roller. The receiving unit 17 receives the bank bill B to be withdrawn toward the stage 14 and receives the bank bill B to be returned toward the pusher plate 12.

The sending unit 18 has, for example, a roller, a separator roller, or the like. The sending unit 18 sends the deposited bank bill B toward the discrimination unit 20 from the stage 14 that has descended below the position illustrated in FIG. 3 (see the dotted arrow in FIG. 3).

Here, before describing a configuration for raising and lowering the roof 11, the pusher plate 12, and the pusher 13 (see FIGS. 6 to 13), the outline of an operation at the time of deposit (FIGS. 4A to 4I) and an operation at the time of withdrawal (FIGS. 5A to 5G) of the bank bill deposit/withdrawal unit 10 will be described.

FIGS. 4A to 4I are left side views illustrating the internal structure of the bank bill deposit/withdrawal unit 10 for explaining the operation at the time of deposition.

Figure 4A:
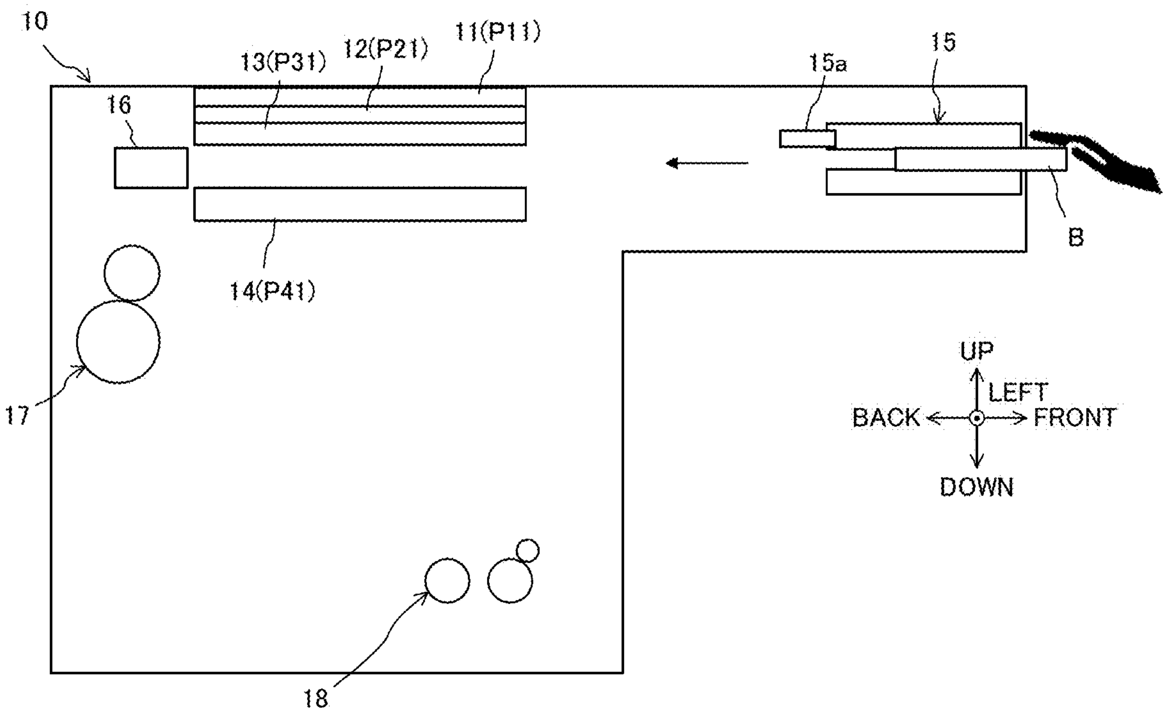
FIG. 4A is a left side view (part 1) illustrating an internal structure of a bank bill deposit/withdrawal unit for explaining an operation at the time of deposition in one embodiment.

First, as illustrated in FIG. 4A, the bank bill B is inserted between the pair of upper and lower conveying belts of the shuttle 15. At this time, the roof 11, the pusher plate 12, the pusher 13, and the stage 14 are at initial positions P11, P21, P31, and P41, respectively. Note that the roof 11, the pusher plate 12, and the pusher 13 are in close contact with each other at these initial positions, but the stage 14 is positioned below the pusher 13 with a space therebetween to form the storage space for the bank bill B.

Figure 4B:
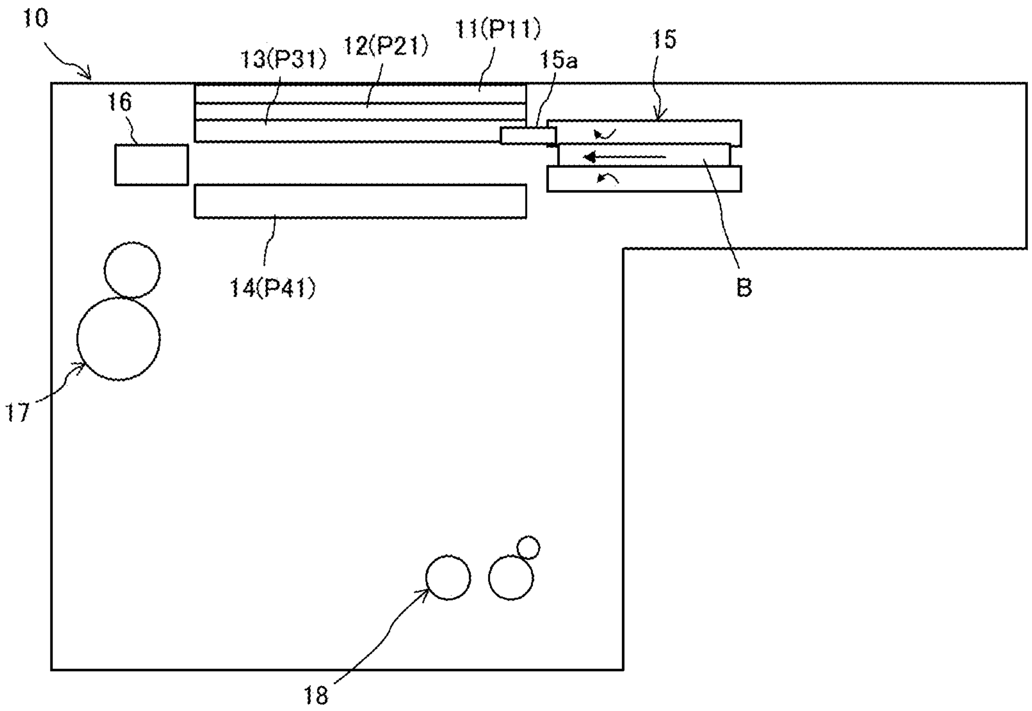
FIG. 4B is a left side view (part 2) illustrating the internal structure of the bank bill deposit/withdrawal unit for explaining the operation at the time of deposition in the one embodiment.

Next, as illustrated in FIG. 4B, the shuttle 15 moves backward toward the stage 14 while sandwiching the bank bill B. After the shuttle 15 moves backward, the pair of conveying belts of the shuttle 15 conveys the bank bill B onto the stage 14.

Figure 4C:
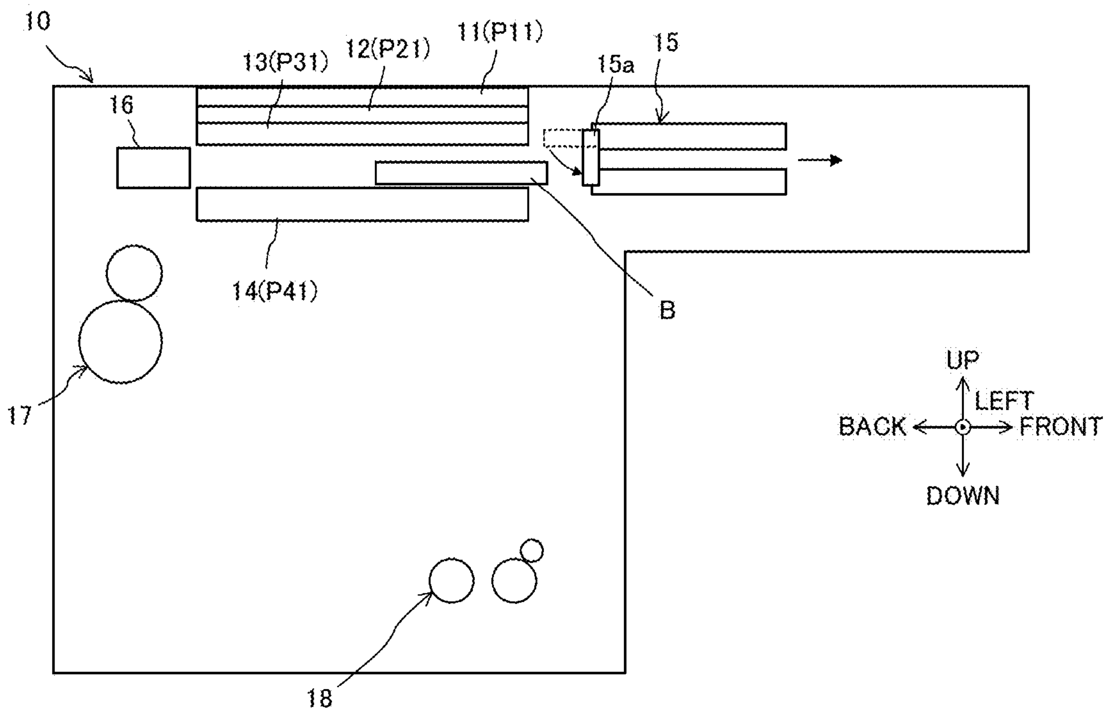
FIG. 4C is a left side view (part 3) illustrating the internal structure of the bank bill deposit/withdrawal unit for explaining the operation at the time of deposition in the one embodiment.

Next, as illustrated in FIG. 4C, the shuttle 15 moves slightly forward once, and the stopper 15*a* rotates to the position where the space between the back ends of the pair of upper and lower conveying belts is closed.

Figure 4D:
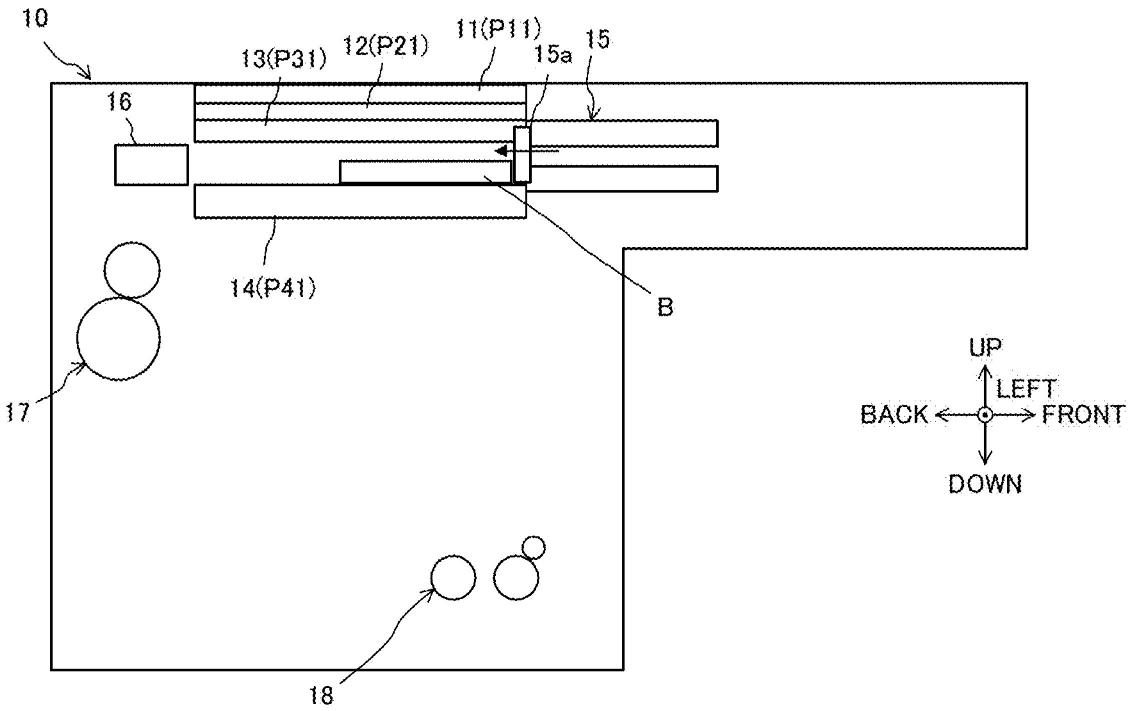
FIG. 4D is a left side view (part 4) illustrating the internal structure of the bank bill deposit/withdrawal unit for explaining the operation at the time of deposition in the one embodiment.

Next, as illustrated in FIG. 4D, when the shuttle 15 moves backward again, the stopper 15*a* pushes the bank bill B on the stage 14 backward.

Figure 4E:
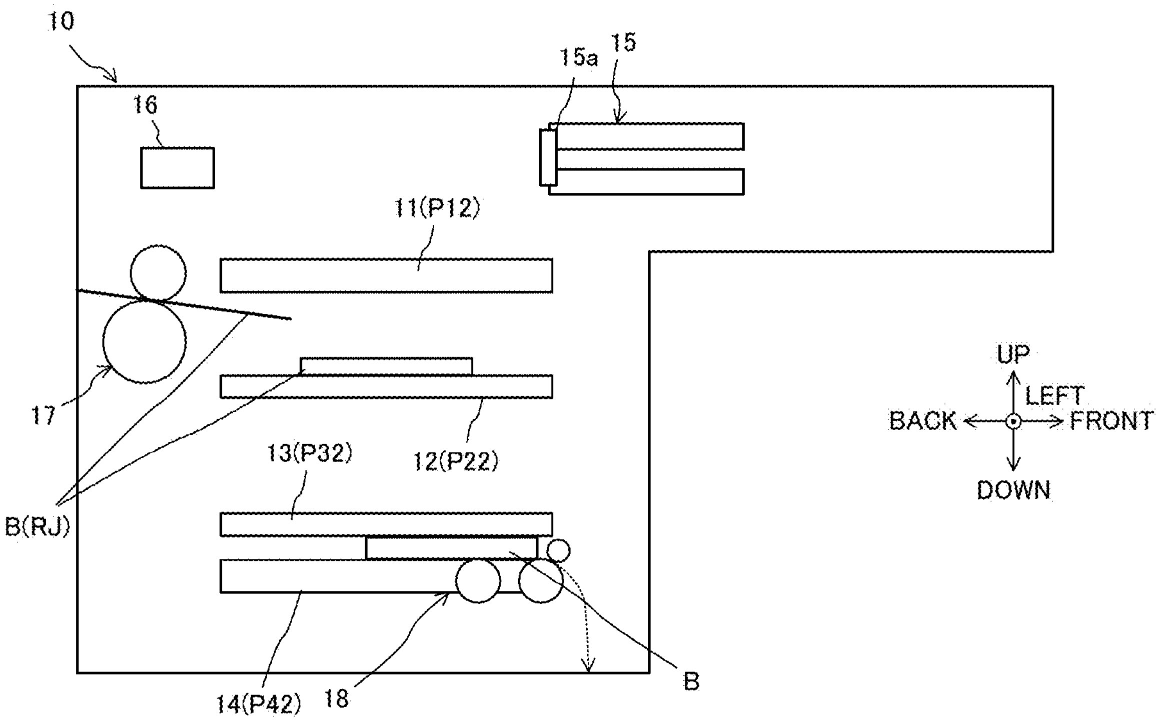
FIG. 4E is a left side view (part 5) illustrating the internal structure of the bank bill deposit/withdrawal unit for explaining the operation at the time of deposition in the one embodiment.

Next, as illustrated in FIG. 4E, the roof 11 and the pusher plate 12 descends to lower limit positions P12 and P22 spaced apart from each other, and the pusher 13 descends to a pressing position P32 where the pusher 13 presses the bank bill B on the stage 14 that has descended to a sending position P42 from above.

Then, the sending unit 18 sends the bank bill B on the stage 14 toward the discrimination unit 20 (see the dotted arrow in FIG. 4E).

A rejected bank bill B (RJ) determined to be abnormal by the discrimination unit 20 among the bank bills B sent by the sending unit 18 is returned to the bank bill deposit/withdrawal unit 10 as illustrated in the conveyance route R2 indicated by the bold dotted arrow in FIG. 2A described above, and received onto the pusher plate 12 from the receiving unit 17.

Figure 4F:
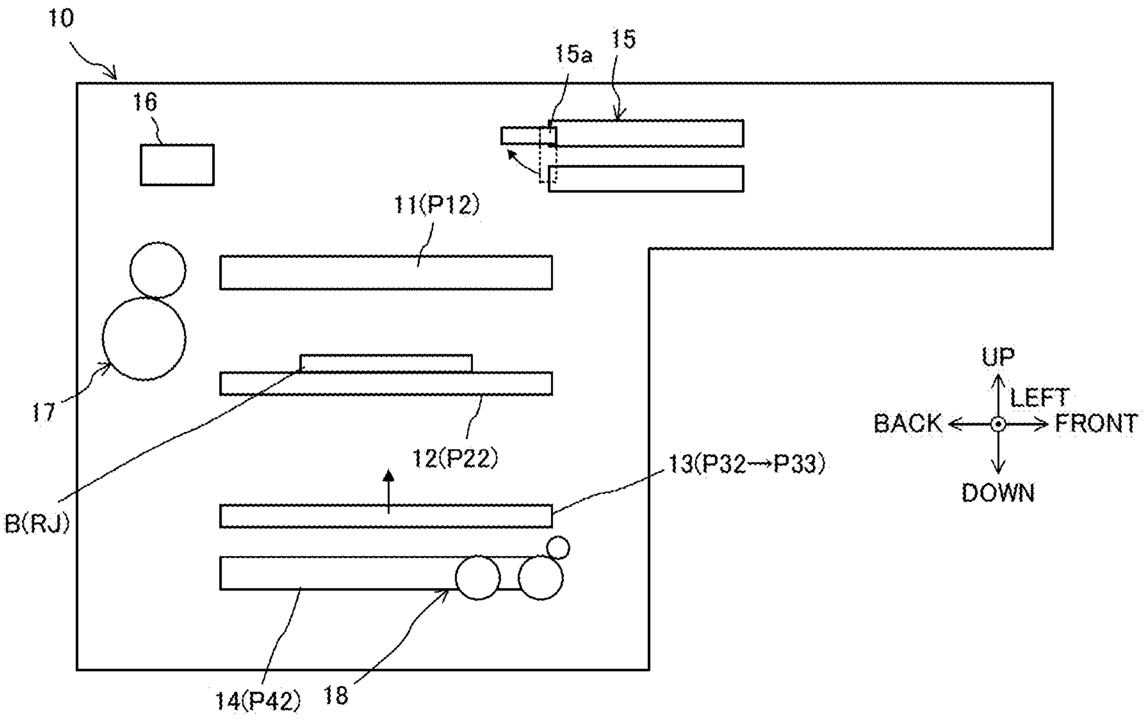
FIG. 4F is a left side view (part 6) illustrating the internal structure of the bank bill deposit/withdrawal unit for explaining the operation at the time of deposition in the one embodiment.

Next, as illustrated in FIG. 4F, first, the pusher 13 ascends toward a rejected bank bill ejection position P33, and the stopper 15*a* rotates to the position where the space between the back ends of the pair of upper and lower conveying belts is opened.

Figure 4G:
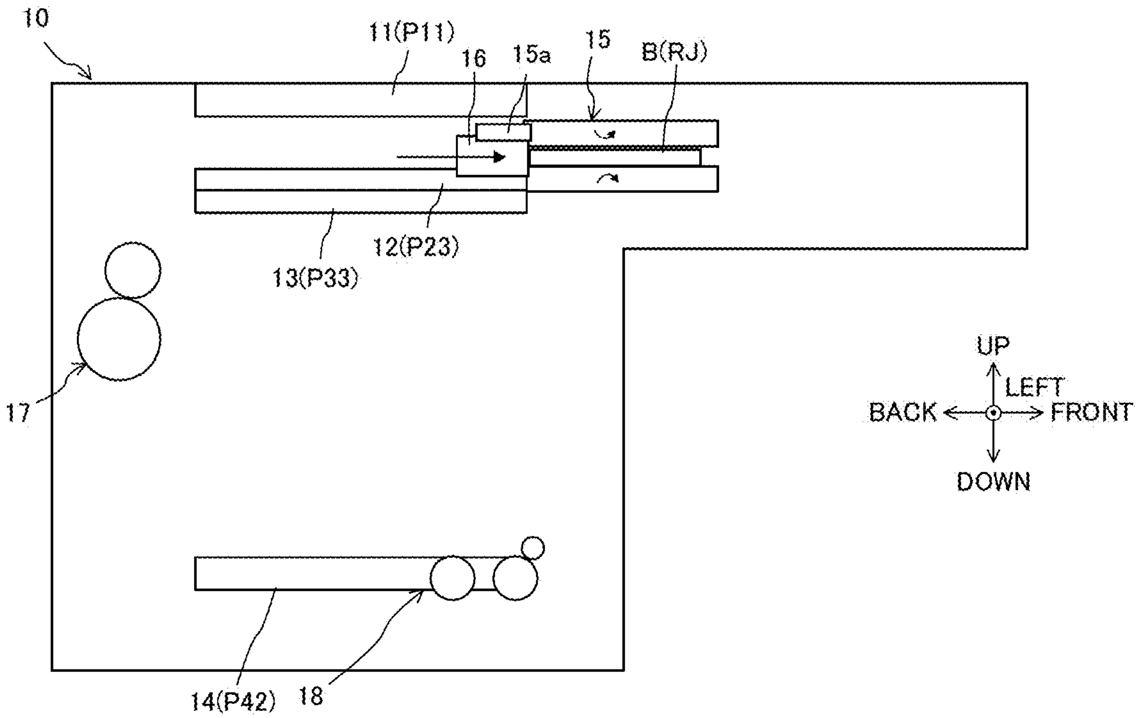
FIG. 4G is a left side view (part 7) illustrating the internal structure of the bank bill deposit/withdrawal unit for explaining the operation at the time of deposition in the one embodiment.

Next, as illustrated in FIG. 4G, when the roof 11 and the pusher plate 12 also ascend, the roof 11 reaches the initial position P11 and the pusher plate 12 and the pusher 13 reach the rejected bank bill ejection positions P23 and P33, and then the push-in wall 16 pushes the rejected bank bill B (RJ) on the stage 14 forward toward the shuttle 15.

Figure 4H:
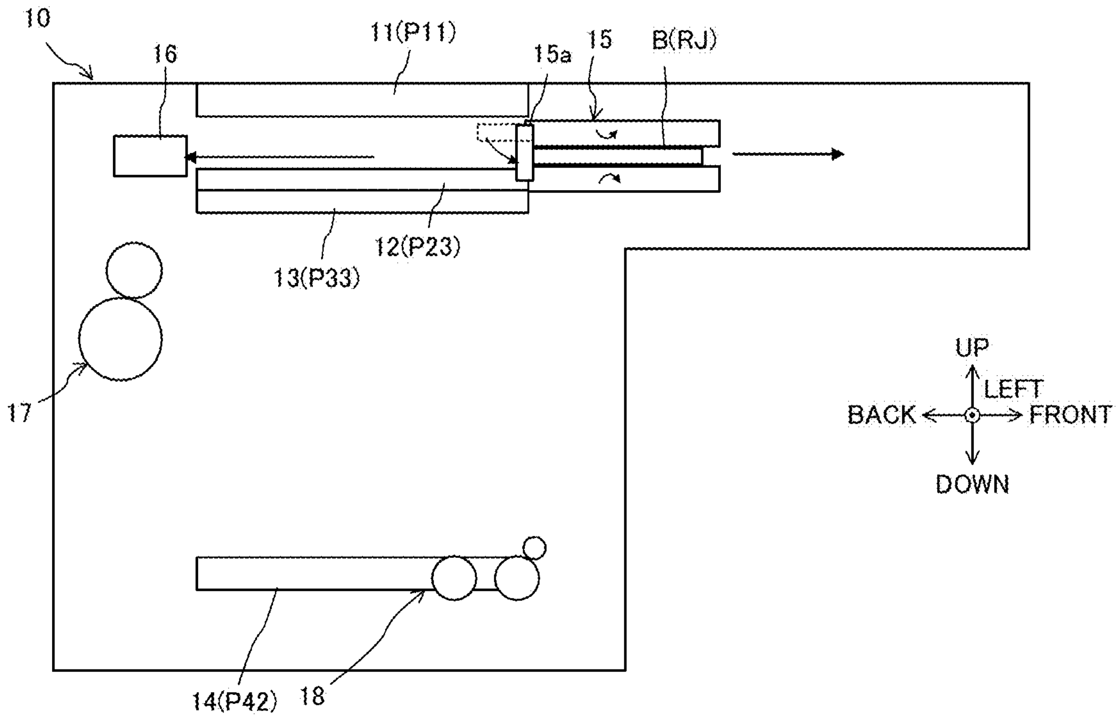
FIG. 4H is a left side view (part 8) illustrating the internal structure of the bank bill deposit/withdrawal unit for explaining the operation at the time of deposition in the one embodiment.

Next, as illustrated in FIG. 4H, the push-in wall 16 returns backward, and the stopper 15*a* rotates to the position where the space between the back ends of the pair of upper and lower conveying belts is closed.

Figure 4I:
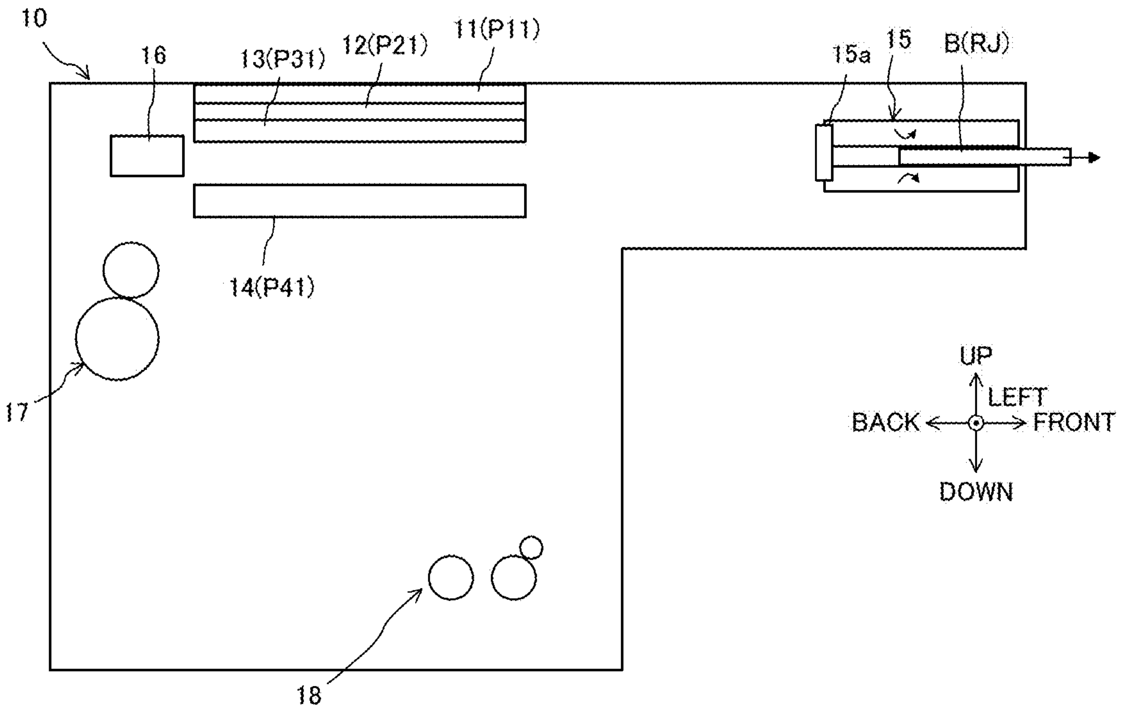
FIG. 4I is a left side view (part 9) illustrating the internal structure of the bank bill deposit/withdrawal unit for explaining the operation at the time of deposition in the one embodiment.

Next, as illustrated in FIG. 4I, the shuttle 15 moves forward, and the pair of upper and lower conveying belts ejects the rejected bank bill B (RJ) forward of the bank bill deposit/withdrawal unit 10.

FIGS. 5A to 5G are left side views illustrating the internal structure of the bank bill deposit/withdrawal unit 10 for explaining the operation at the time of withdrawal.

Figure 5A:
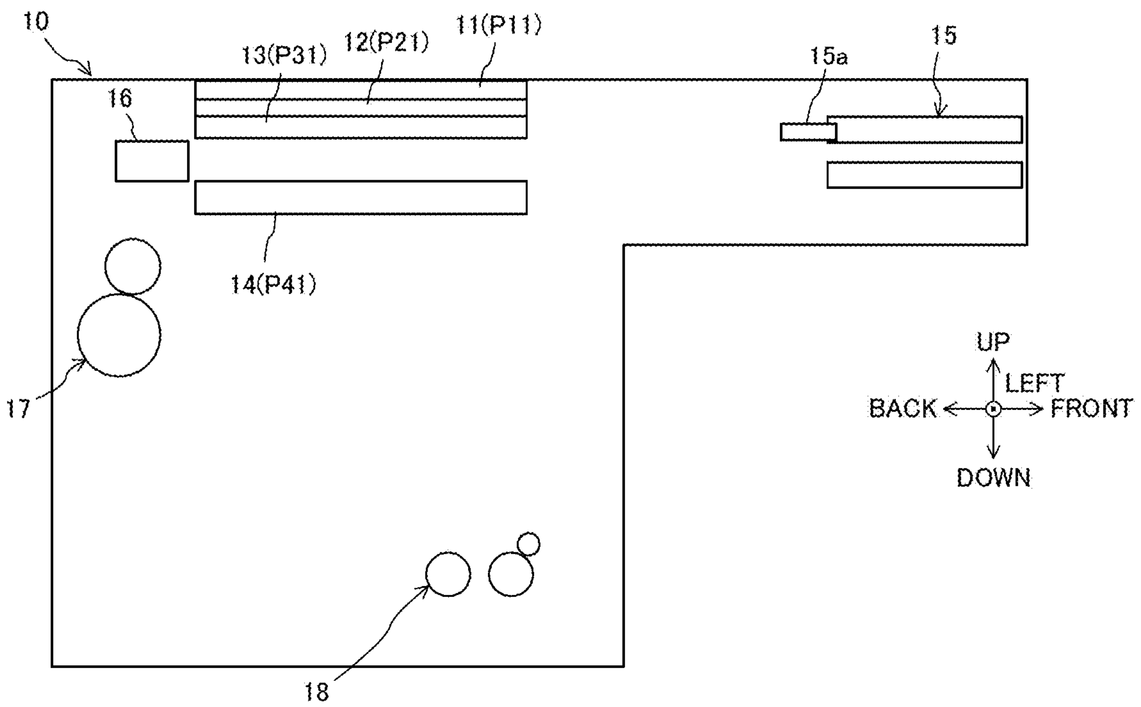
FIG. 5A is a left side view (part 1) illustrating the internal structure of the bank bill deposit/withdrawal unit for explaining an operation at the time of withdrawal in one embodiment.

First, as illustrated in FIG. 5A, as in the start of the deposition operation illustrated in FIG. 4A, the roof 11, the pusher plate 12, the pusher 13, and the stage 14 are at the initial positions P11, P21, P31, and P41, respectively.

Figure 5B:
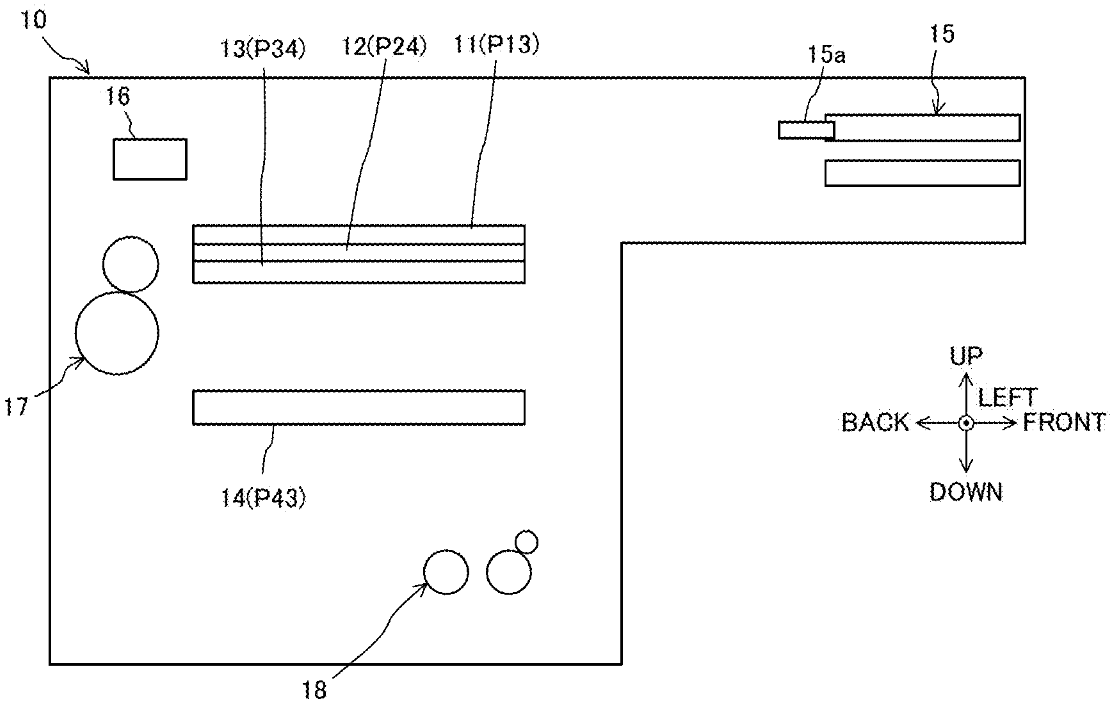
FIG. 5B is a left side view (part 2) illustrating the internal structure of the bank bill deposit/withdrawal unit for explaining the operation at the time of withdrawal in the one embodiment.

Next, as illustrated in FIG. 5B, the roof 11, the pusher plate 12, and the pusher 13 descend integrally to withdrawal positions P13, P24, and P34. The stage 14 also descends to a withdrawal position P43. Note that the withdrawal position P43 of the stage 14 may be detected by an upper end detection sensor of the bank bill B (not illustrated).

Figure 5C:
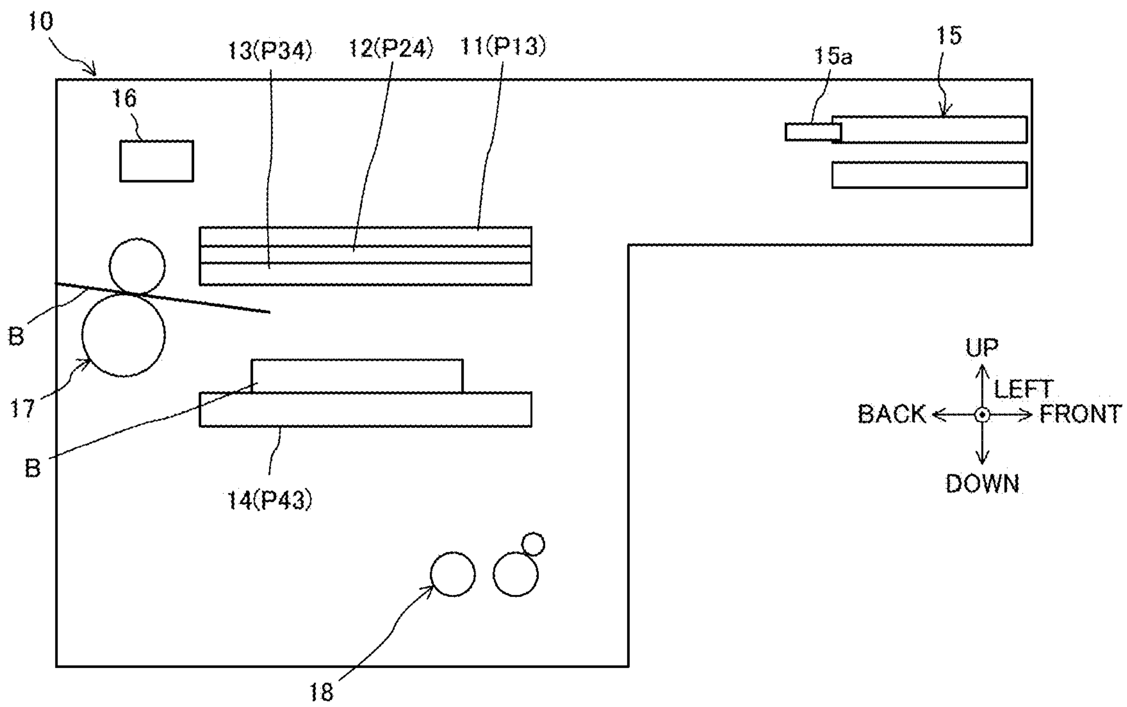
FIG. 5C is a left side view (part 3) illustrating the internal structure of the bank bill deposit/withdrawal unit for explaining the operation at the time of withdrawal in the one embodiment.

Next, as illustrated in FIG. 5C, the bank bill B withdrawn from each storage cassette 60 (see the conveyance route R4 indicated by the bold solid arrow in FIG. 2C) is received onto the stage 14 by the receiving unit 17.

Figure 5D:
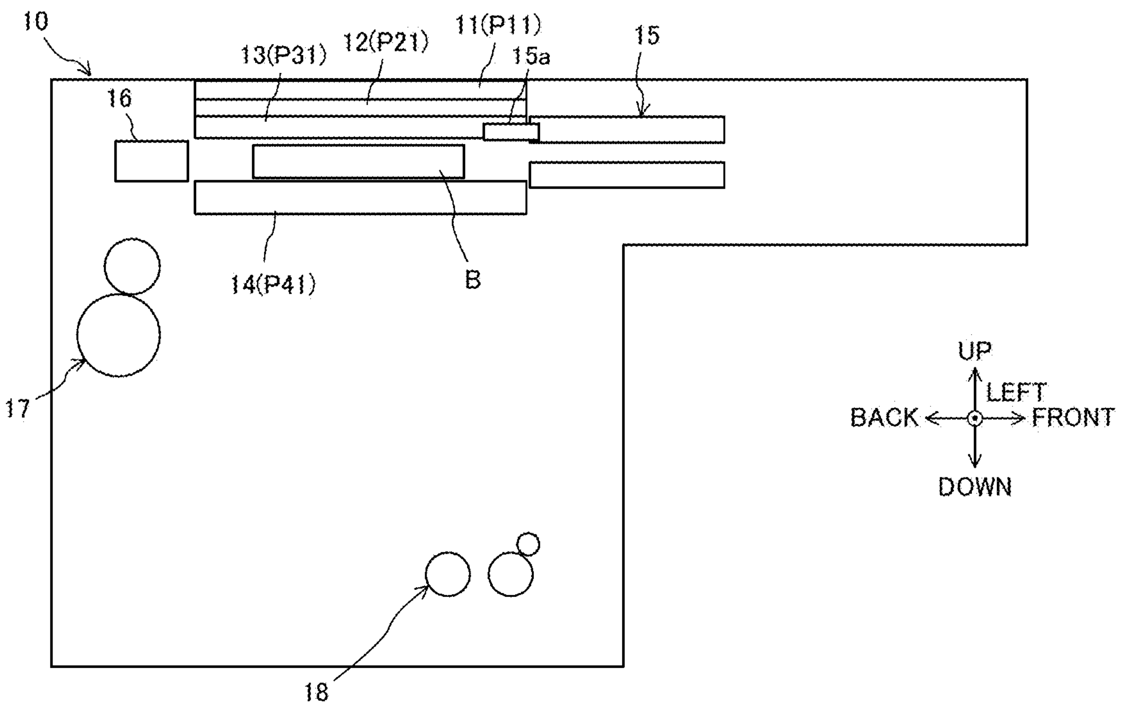
FIG. 5D is a left side view (part 4) illustrating the internal structure of the bank bill deposit/withdrawal unit for explaining the operation at the time of withdrawal in the one embodiment.

Next, as illustrated in FIG. 5D, the roof 11, the pusher plate 12, the pusher 13, and the stage 14 ascend to the initial positions P11, P21, P31, and P41, and the shuttle 15 moves backward to receive the bank bill B.

Figure 5E:
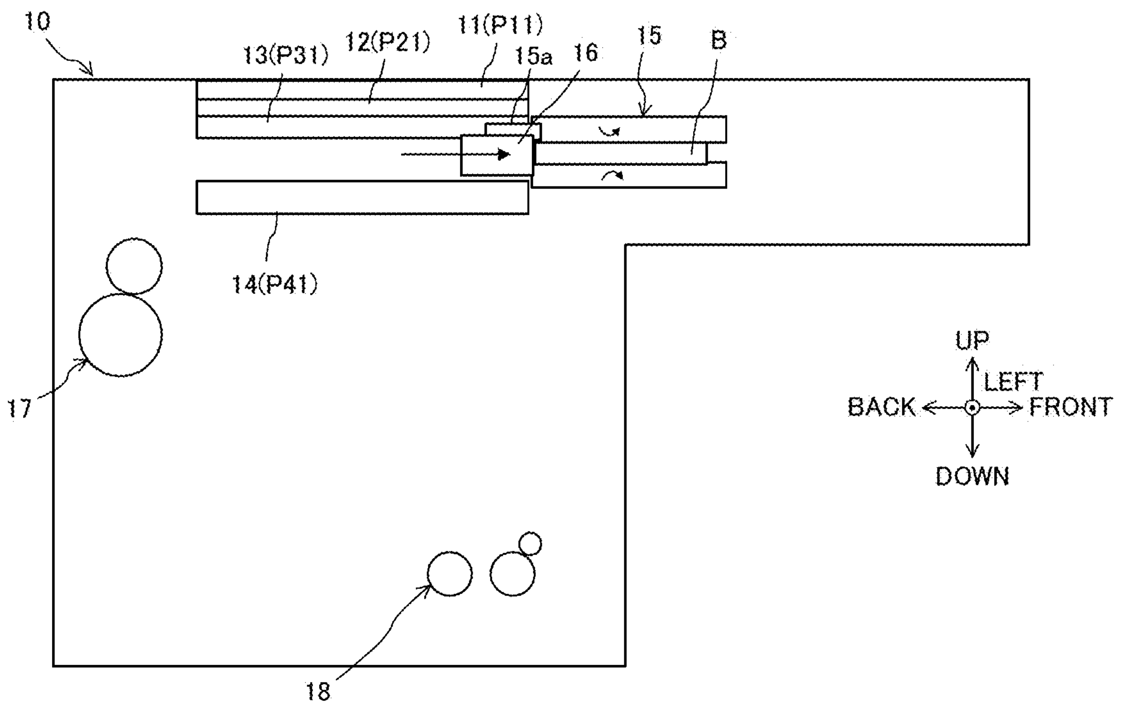
FIG. 5E is a left side view (part 5) illustrating the internal structure of the bank bill deposit/withdrawal unit for explaining the operation at the time of withdrawal in the one embodiment.

Next, as illustrated in FIG. 5E, the push-in wall 16 pushes the bank bill B on the stage 14 forward toward the shuttle 15.

Figure 5F:
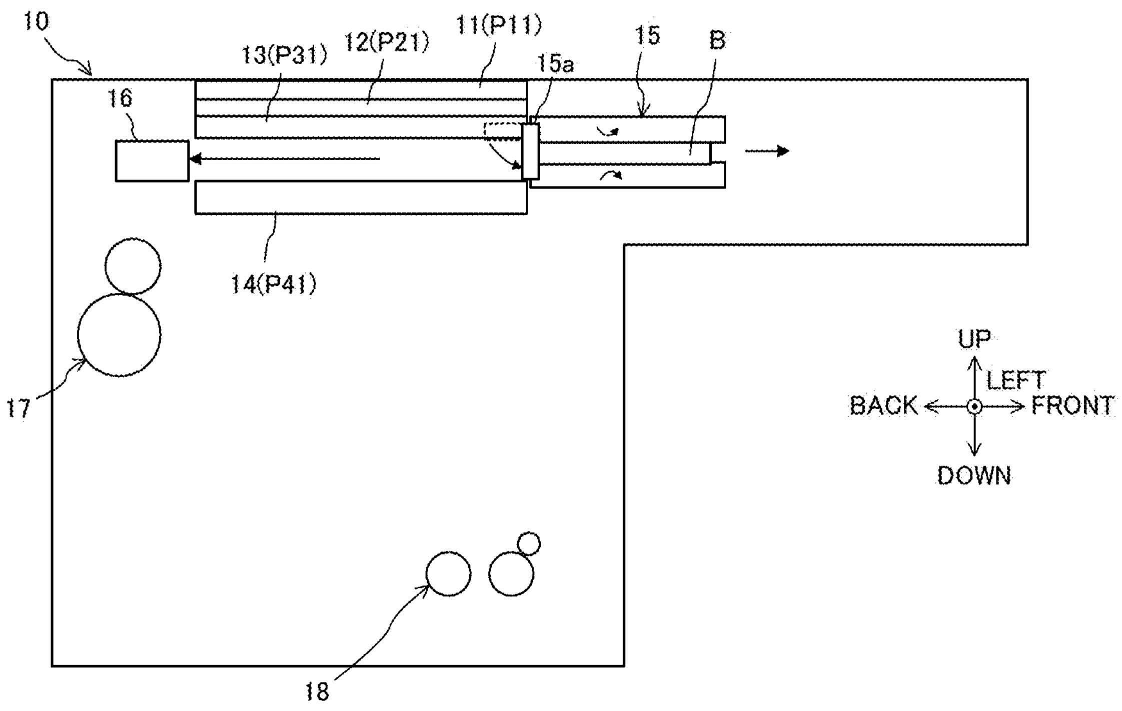
FIG. 5F is a left side view (part 6) illustrating the internal structure of the bank bill deposit/withdrawal unit for explaining the operation at the time of withdrawal in the one embodiment.

Next, as illustrated in FIG. 5F, the push-in wall 16 returns backward, and the stopper 15*a* rotates to the position where the space between the back ends of the pair of upper and lower conveying belts is closed.

Figure 5G:
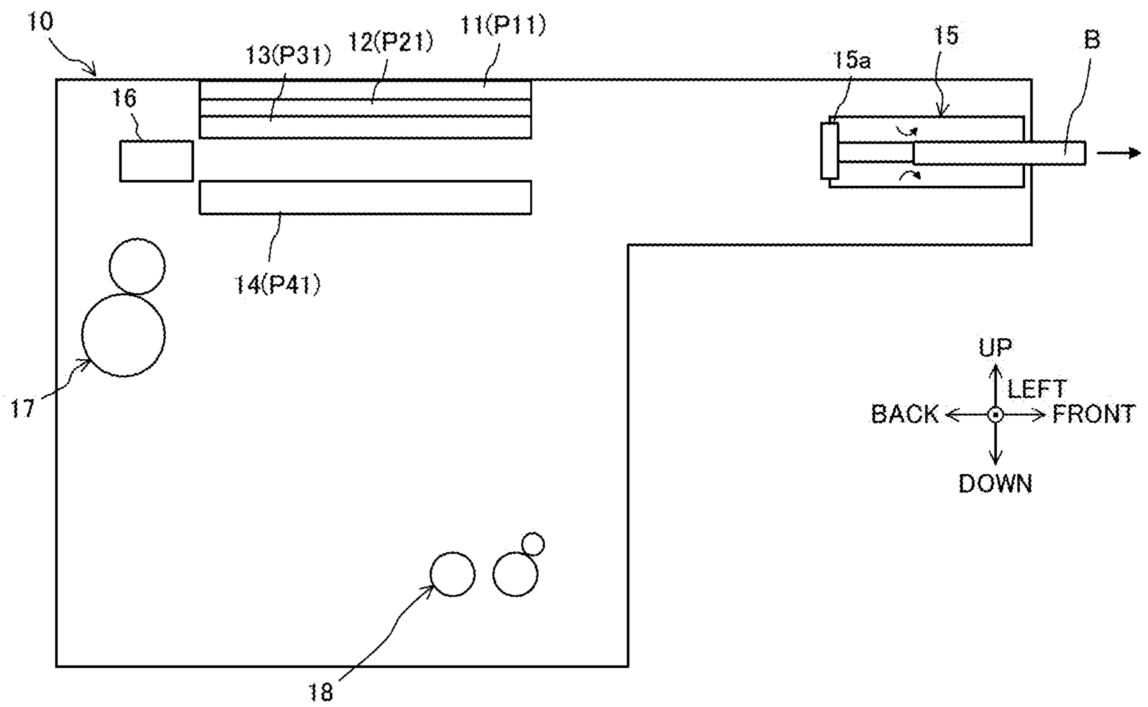
FIG. 5G is a left side view (part 7) illustrating the internal structure of the bank bill deposit/withdrawal unit for explaining the operation at the time of withdrawal in the one embodiment.

Next, as illustrated in FIG. 5G, the shuttle 15 moves forward, and the pair of upper and lower conveying belts ejects the bank bill B forward of the bank bill deposit/withdrawal unit 10.

Here, the configuration for raising and lowering the roof 11, the pusher plate 12, and the pusher 13 will be described with reference to FIGS. 6 to 13.

Figure 6:
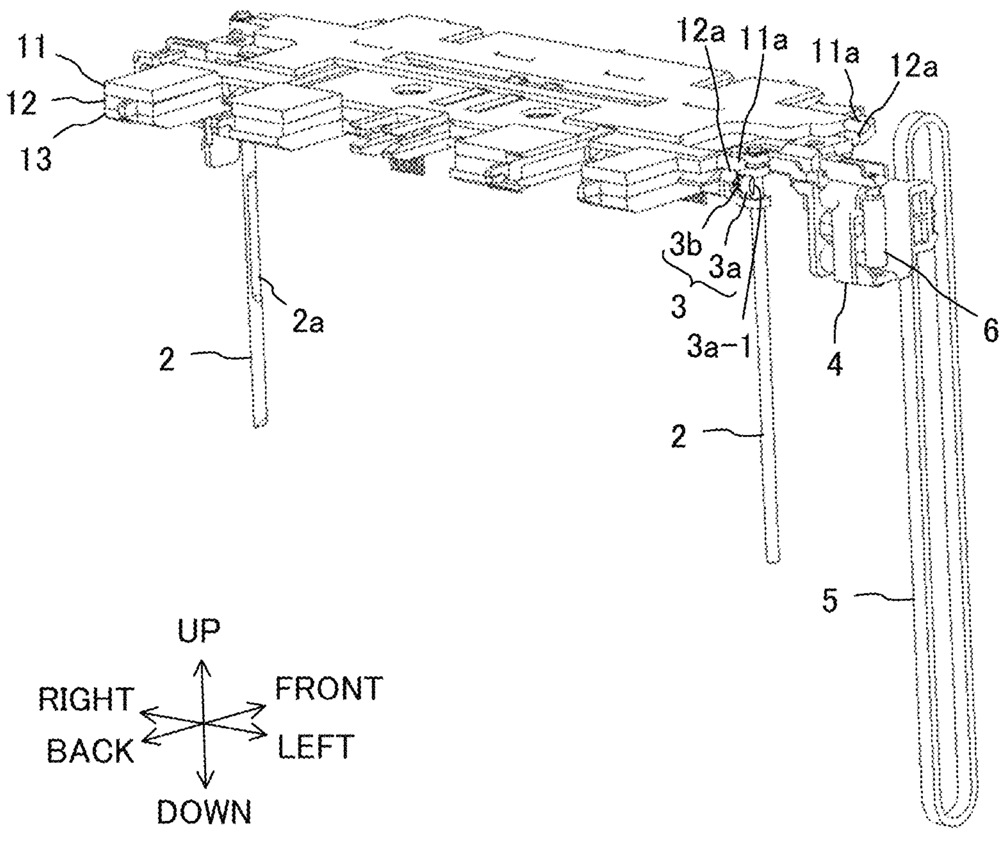
FIG. 6 is a perspective view illustrating a roof, a pusher plate, a pusher, and the like in one embodiment.

As illustrated in FIG. 6, the two guides 2 are fixed to the left back portion and the right front portion of the roof 11 at the upper end, and extend downward through the pusher plate 12. The guides 2 are, for example, rod-like (cylindrical) shafts, but may be in a quadrangular prism shape, and the shape is not particularly limited. Recessed portions 2*a* are formed on the right side of the guide 2 on the left back portion (see FIG. 8) and the left side of the guide 2 on the right front portion (see FIG. 6). The recessed portion 2*a*, when facing a pressing portion 3 to be described later, acts to cancel the frictional force generated by the pressing portion 3 pressing the guide 2, and is provided over a predetermined range in the up-down direction. Note that the recessed portion 2*a* only needs to be a recessed (concave) portion, and thus may be a hole, a notch, or the like penetrating the guide 2.

Figure 7:
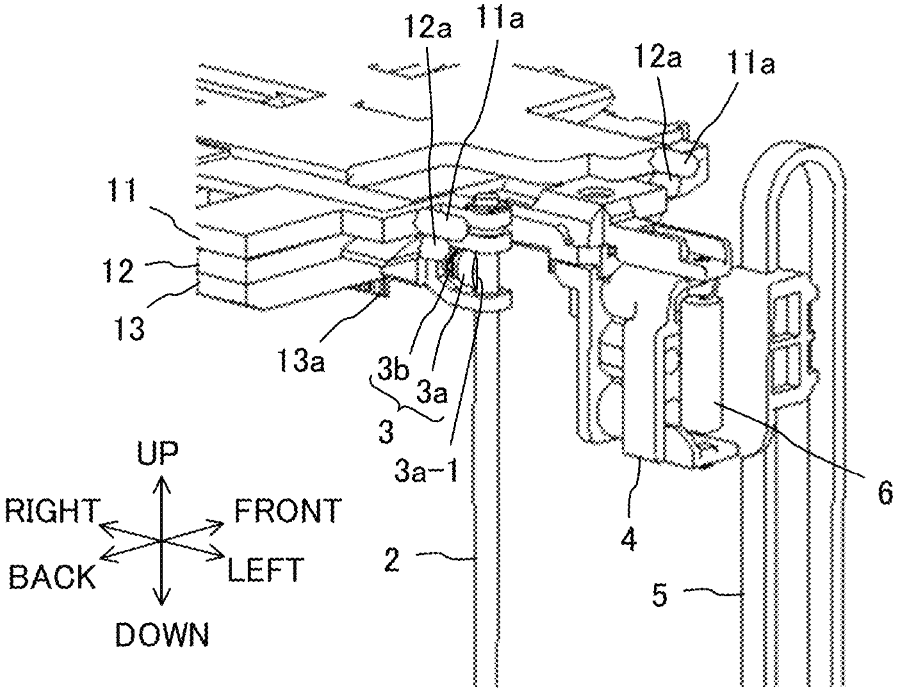
FIG. 7 is a perspective view illustrating a pressing portion, a tension spring, and the like in one embodiment.
Figure 8:
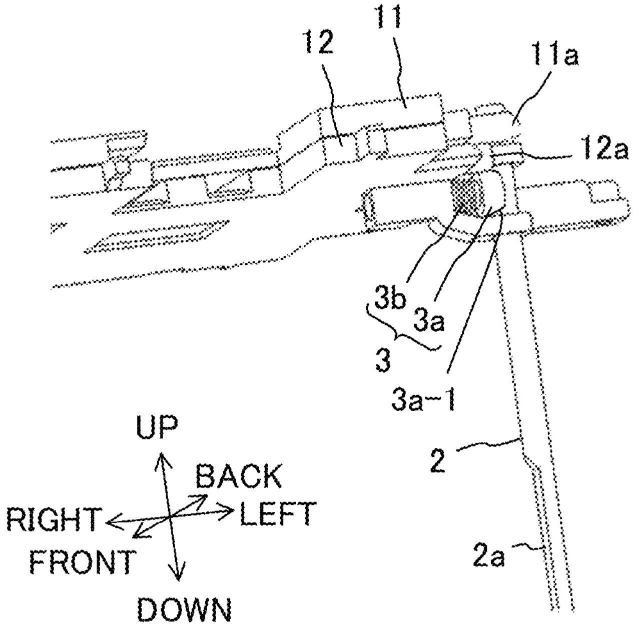
FIG. 8 is a perspective view illustrating the pressing portion and the like in one embodiment.
Figure 12:
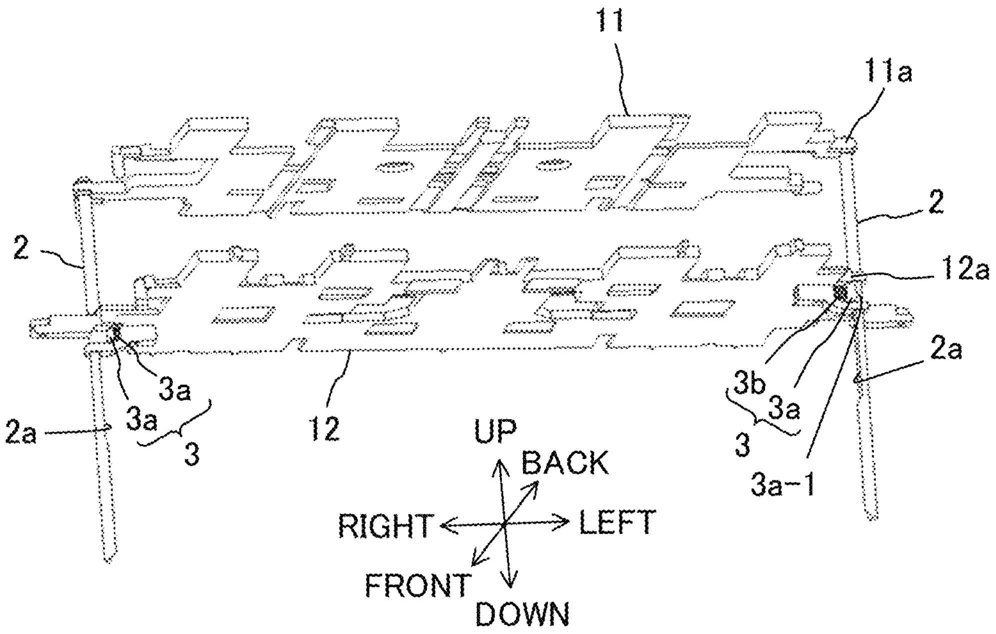
FIG. 12 is a perspective view illustrating the roof, the pusher plate, and the like in one embodiment.

As illustrated in FIG. 12, the two pressing portions 3 are fixed to the left back portion and the right front portion of the pusher plate 12. The pressing portion 3 has a pin 3*a* extending in the left-right direction and having a large diameter at a contact portion with the guide 2, and a compression spring 3*b* that biases the pin 3*a* toward the guide 2. As illustrated in FIGS. 7 and 8, a groove 3*a*-1 extending in the up-down direction for accommodating a part of the guide 2 is preferably formed in the contact portion of the pin 3*a* with the guide 2. Thus, the rotation of the pin 3*a* is suppressed. Note that the compression spring 3*b* may bias the pin 3*a* toward the guide 2 using a biasing force that enables the pusher plate 12 to ascend and descend integrally with the roof 11 due to a frictional force generated by the pin 3*a* pressing the guide 2.

As illustrated in FIGS. 6 and 7, the movable member 4 is fixed to the pusher 13 and ascends and descends due to the rotation of the endless belt-shaped timing belt 5. This raises and lowers the pusher 13.

The tension spring 6 is hooked and fixed to the movable member 4 at the lower end, and is hooked and fixed to the pusher plate 12 at the upper end. Due to this, when the movable member 4 descends, the tension spring 6 pulls the pusher plate 12 downward and lowers the pusher plate 12.

Figure 10:
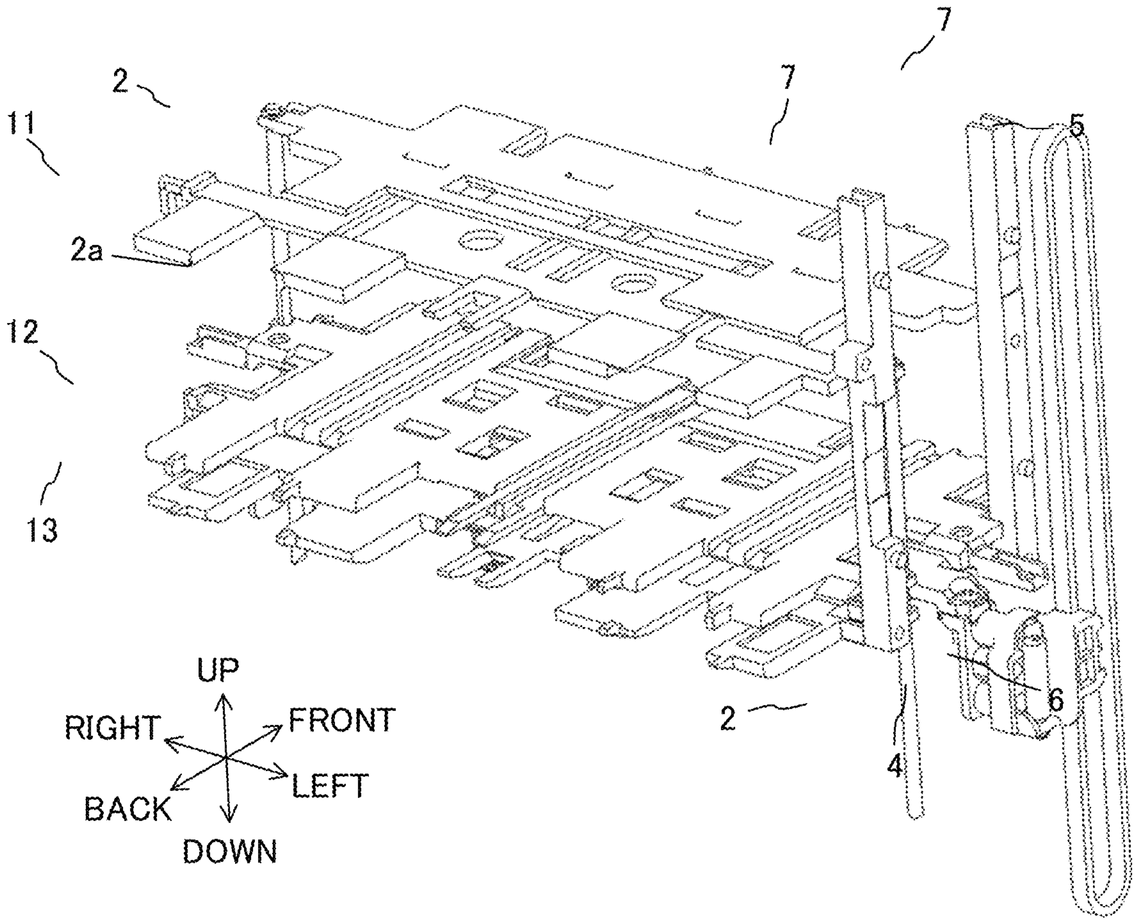
FIG. 10 is a perspective view illustrating two rails and the like in one embodiment.

As illustrated in FIG. 10, the two rails 7 are arranged side by side in the front-back direction on the left side of the roof 11, the pusher plate 12, and the pusher 13, and extend in the up-down direction. Each of the two rails 7 has a U-shape facing rightward in plan view.

The hollow portion in the rail 7 has a depth in the left-right direction that is deep at the upper portion of the rail 7 and shallow at the lower portion of the rail 7, and the step functions as a first stopper 7*a*. In addition, the hollow portion in the rail 7 is not provided up to the lower end of the rail 7 and there is no hollow portion at the lower portion of the rail 7, and thus the step functions as a second stopper 7*b*. In this manner, the first stopper 7*a* and the second stopper 7*b* are provided on the common rail 7.

As illustrated in FIG. 11, the first stoppers 7*a* of the two rails 7 come into contact with two protrusions 11*a* protruding leftward from the roof 11 at the lower limit position of the roof 11. As a result, the roof 11 no longer descends after the protrusion 11*a* and the first stopper 7*a* come into contact with each other. Note that the lower limit position of the roof 11 is, for example, the lower limit position P12 illustrated in FIG. 4E.

As illustrated in FIG. 11, the second stoppers 7*b* of the two rails 7 come into contact with two protrusions 12*a* protruding leftward from the pusher plate 12 at the lower limit position of the pusher plate 12. As a result, the pusher plate 12 no longer descends after the protrusion 12*a* and the second stopper 7*b* come into contact with each other. Note that the lower limit position of the pusher plate 12 is, for example, the lower limit position P22 illustrated in FIG. 4E.

Note that the protrusion 12*a* of the pusher plate 12 has a smaller protruding amount in the left direction than the protrusion 11*a* of the roof 11, and the end of the protrusion 12*a* is positioned on the right side of the end of the protrusion 11*a*. Due to this, the protrusion 12*a* of the pusher plate 12 does not come into contact with the first stopper 7*a*.

With the above-described configuration, the roof 11, the pusher plate 12, and the pusher 13 ascend and descend as follows. First, as illustrated in FIGS. 6 and 7, the roof 11, the pusher plate 12, and the pusher 13 that are in close contact with each other at the initial positions (the initial positions P11, P21, and P31 in FIGS. 4A and 5A), the pusher 13 first descends due to the rotation of the timing belt 5 (descent of the movable member 4).

As the pusher 13 descends, the tension spring 6 fixed to the pusher 13 via the movable member 4 pulls the pusher plate 12 downward and lowers the pusher plate 12. Then, as the pusher plate 12 descends, the roof 11 descends integrally due to the frictional force generated by the pressing portion 3 fixed to the pusher plate 12 pressing the guide 2. In this manner, first, the roof 11, the pusher plate 12, and the pusher 13 descend integrally (see FIG. 5B).

Figure 9:
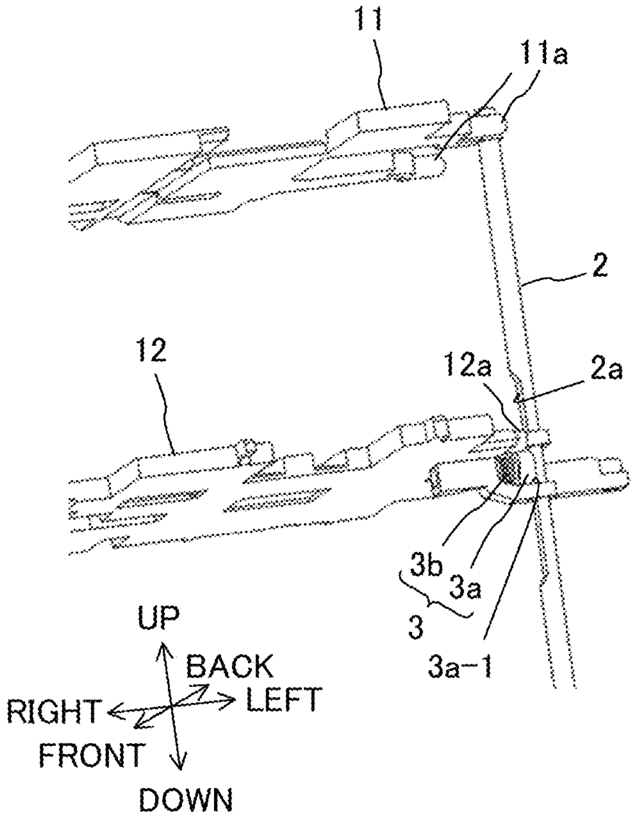
FIG. 9 is a perspective view illustrating the pressing portion and the like in one embodiment.

Thereafter, the two protrusions 11*a* of the roof 11 come into contact with the first stoppers 7*a* (see FIG. 11) of the two rails 7, and then the pusher plate 12 and the pusher 13 descend independently of the roof 11 against the frictional force generated by the pressing portion 3 pressing the guide 2. As illustrated in FIG. 9, when the pusher plate 12 descends to a position where the pressing portion 3 faces the recessed portion 2*a* of the guide 2, the frictional force is canceled.

Thereafter, the two protrusions 12*a* of the pusher plate 12 come into contact with the second stoppers 7*b* (see FIG. 11) of the two rails 7, and, as illustrated in FIGS. 10 and 11, the pusher 13 descends independently of the pusher plate 12 against the restoring force of the tension spring 6.

When the roof 11, the pusher plate 12, and the pusher 13 ascend from the descending positions, the pusher 13 first ascends due to the rotation of the timing belt 5 (ascent of the movable member 4).

Figure 13:
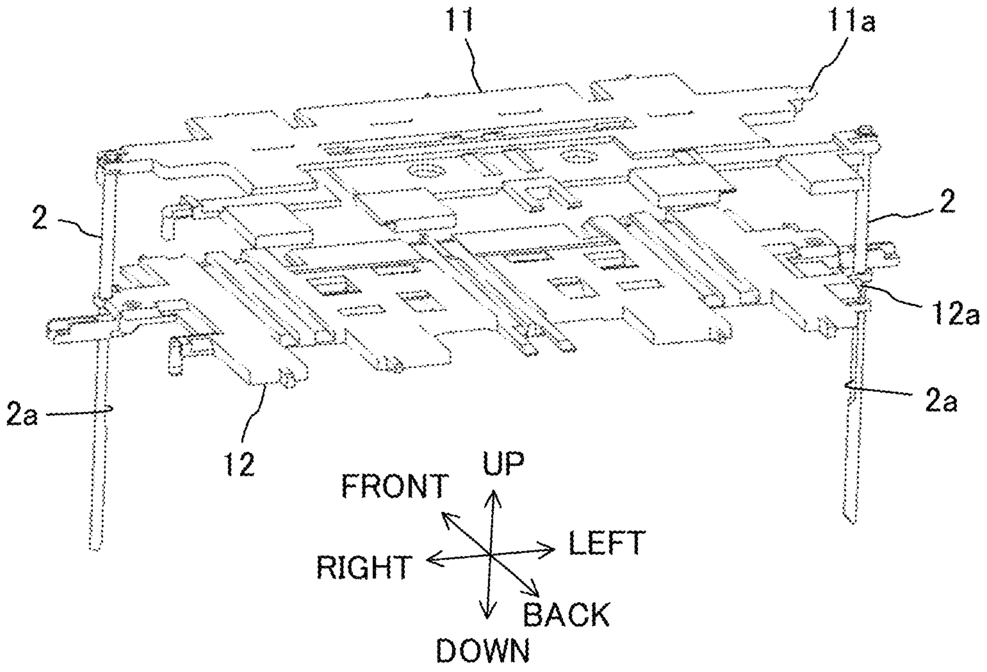
FIG. 13 is a perspective view illustrating the roof, the pusher plate, and the like in one embodiment.

Thereafter, when the pusher 13 lifts the pusher plate 12 at the lower limit position, the pusher plate 12 also starts to ascend, the pusher plate 12 ascends to a position where the pressing portion 3 fixed to the pusher plate 12 no longer faces the recessed portion 2*a* of the guide 2 as illustrated in FIGS. 12 and 13, and then the roof 11 ascends integrally with the pusher plate 12 and the pusher 13 due to the above-described frictional force. Then, the roof 11, the pusher plate 12, and the pusher 13 return to the initial positions as illustrated in FIGS. 6 and 7. Note that the upper limit position of the roof 11 is preferably determined by, for example, being in contact with the inner upper surface of the bank bill deposit/withdrawal unit 10.

Here, although the pusher 13 is driven by the timing belt 5 (drive unit) in the bank bill deposit/withdrawal unit 10 (bank bill processing machine 100), the roof 11 and the pusher plate 12 may be raised and lowered by driving the pusher plate 12. In addition, although the roof 11 has been described as an example of the first partition member, and the pusher plate 12 has been described as an example of the second partition member, the first partition member may be the pusher plate 12, the second partition member may be the pusher 13, or the like, and each partition member may be any member.

In the present embodiment described above, the bank bill processing machine 100, which is an example of the paper sheet handling apparatus, includes: a plurality of partition members that have the roof 11 (an example of the first partition member) and the pusher plate 12 (an example of the second partition member) arranged below the roof 11 and are capable of ascending and descending to form the storage space for the bank bill B (an example of the paper sheet); the guide 2 that is fixed to the roof 11 and extends downward; the first stopper 7*a* (see FIG. 11) that is in contact with the roof 11 at the lower limit position P12 (see FIG. 4E) of the roof 11; and the pressing portion 3 that is fixed to the pusher plate 12 and raises and lowers the roof 11 integrally with the pusher plate 12 using the frictional force generated by pressing the guide 2. The guide 2 has the recessed portion 2*a* that cancels the frictional force, and the pusher plate 12 descends integrally with the roof 11, and, after the roof 11 comes into contact with the first stopper 7*a*, descends independently of the roof 11 against the frictional force to the position where the pressing portion 3 faces the recessed portion 2*a*. In addition, the pusher plate 12 ascends integrally with the roof 11 due to the frictional force when the pusher plate 12 ascends to the position where the pressing portion 3 no longer faces the recessed portion 2*a* from the position where the pressing portion 3 faces the recessed portion 2*a*.

This enables the pusher plate 12 to be raised and lowered integrally with the roof 11 or to be raised and lowered independently of the roof 11. Thus, the arrangement of the drive unit (drive source) that individually raises and lowers the roof 11 can be omitted. Therefore, according to the present embodiment, the plurality of partition members (the roof 11, the pusher plate 12, and the like) can be raised and lowered to the plurality of predetermined positions with the simple configuration.

In addition, in the present embodiment, the plurality of partition members further have the pusher 13 (an example of the third partition member) arranged below the pusher plate 12 (an example of the second partition member). The bank bill processing machine 100 further includes the second stopper 7*b* (see FIG. 11) that comes into contact with the pusher plate 12 at the lower limit position P22 (see FIG. 4E) of the pusher plate 12, and the tension spring 6 that is fixed to the pusher 13 and pulls the pusher plate 12 downward. The pusher 13 is arranged so as to be capable of lifting the pusher plate 12 at the time of ascent, and descends independently of the pusher plate 12 against the restoring force of the tension spring 6 after the pusher plate 12 pulled downward by the tension spring 6 comes into contact with the second stopper 7*b* at the time of descent.

This enables the pusher 13 to be raised and lowered integrally with the pusher plate 12 or raised and lowered independently of the pusher plate 12. Thus, not only the arrangement of the drive unit (drive source) that individually raises and lowers the roof 11 but also the arrangement of the drive unit that individually raises and lowers the pusher plate 12 can be omitted. Therefore, the plurality of partition members (the roof 11, the pusher plate 12, and the pusher 13) can be raised and lowered to the plurality of predetermined positions with an even simpler configuration.

In addition, in the present embodiment, the bank bill processing machine 100 further includes the rail 7 extending in the up-down direction, and the above-described first stopper 7*a* and the second stopper 7*b* are provided on the above-described common rail 7.

This enables the plurality of partition members (the roof 11, the pusher plate 12, and the pusher 13) to be raised and lowered to the plurality of predetermined positions with an even simpler configuration as compared with a case where the member that determines the lower limit position of the roof 11 (first stopper 7*a*) and the member that determines the lower limit position of the pusher plate 12 (second stopper 7*b*) are arranged on different members.

Note that the present invention is not limited to an original configuration of the above-described embodiment, and can be embodied by modifying components. For example, various inventions can be formed by appropriately combining a plurality of components disclosed in the present embodiment. As described above, various modifications and applications of the invention can be made without departing from the gist of the invention.

What is claimed is:

1. A paper sheet handling apparatus comprising:

a plurality of partitions having a first partition and a second partition arranged below the first partition, the plurality of partitions being capable of ascending and descending to form a storage space for a paper sheet;

a guide fixed to the first partition and extending downward;

a first stopper that is in contact with the first partition at a lower limit position of the first partition; and a pressing portion that is fixed to the second partition and raises and lowers the first partition integrally with the second partition using a frictional force generated by pressing the guide, wherein the guide has a recessed portion that cancels the frictional force, the second partition descends integrally with the first partition, and after the first partition comes into contact with the first stopper, the second partition descends independently of the first partition against the frictional force to a position where the pressing portion faces the recessed portion, and the second partition, when ascending from the position where the pressing portion faces the recessed portion to a position where the pressing portion no longer faces the recessed portion, ascends integrally with the first partition due to the frictional force.

2. The paper sheet handling apparatus according to claim 1, wherein the plurality of partitions further have a third partition arranged below the second partition, the paper sheet handling apparatus further comprises:

a second stopper that comes into contact with the second partition at a lower limit position of the second partition; and a tension spring that is fixed to the third partition and pulls the second partition downward, and the third partition is arranged so as to be capable of lifting the second partition at the time of ascent, and at the time of descent, descends independently of the second partition against a restoring force of the tension spring after the second partition pulled downward by the tension spring comes into contact with the second stopper.

3. The paper sheet handling apparatus according to claim 2, further comprising a rail extending in an up-down direction, wherein the first stopper and the second stopper are provided on the common rail.

* * * * *